United States Patent
Kamerbeek

(10) Patent No.: US 12,179,995 B2
(45) Date of Patent: Dec. 31, 2024

(54) SYSTEM FOR PREPARING A BEVERAGE FROM A CAPSULE USING A FLUID SUPPLIED UNDER PRESSURE INTO THE CAPSULE FOR USE IN SUCH A SYSTEM

(71) Applicant: Koninklijke Douwe Egberts B.V., Utrecht (NL)

(72) Inventor: Ralf Kamerbeek, De Meern (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 771 days.

(21) Appl. No.: 17/416,076

(22) PCT Filed: Dec. 18, 2019

(86) PCT No.: PCT/NL2019/050849
§ 371 (c)(1),
(2) Date: Jun. 18, 2021

(87) PCT Pub. No.: WO2020/130815
PCT Pub. Date: Jun. 25, 2020

(65) Prior Publication Data
US 2022/0073268 A1 Mar. 10, 2022

(30) Foreign Application Priority Data

Dec. 20, 2018 (NL) .................................. 2022265

(51) Int. Cl.
*B65D 85/804* (2006.01)
*A47J 31/36* (2006.01)
*A47J 31/40* (2006.01)

(52) U.S. Cl.
CPC .......... *B65D 85/8064* (2020.05); *A47J 31/36* (2013.01); *A47J 31/407* (2013.01)

(58) Field of Classification Search
CPC ................ A47K 31/36; A47K 31/0647; A47K 31/3623; A47K 31/407; B65D 85/8064
See application file for complete search history.

(56) References Cited

U.S. PATENT DOCUMENTS

2016/0075506 A1 * 3/2016 Chapman ................ A47J 31/36
426/112
2018/0297775 A1 * 10/2018 Dijkstra .............. B65D 85/8043
(Continued)

FOREIGN PATENT DOCUMENTS

EP   1700548      9/2006
EP   2442698 B1   5/2014
(Continued)

OTHER PUBLICATIONS

International Search Report and Written Opinion date of mailing Feb. 14, 2020, International Application No. PCT/NL2019/050849 (12 pgs.).

*Primary Examiner* — Thien S Tran
(74) *Attorney, Agent, or Firm* — Fitch, Even, Tabin & Flannery LLP

(57) ABSTRACT

System for preparing a potable beverage. The system may include a first capsule and an alternative second capsule, a first beverage preparation device and a second beverage preparation device, each arranged for receiving either the first capsule or the alternative second capsule. The first capsule and the alternative second capsule each include a sealing member at the outwardly extending flange for providing a fluid sealing contact with the first enclosing member if the capsule is used in the first beverage preparation device. There is no sealing interface between the first capsule and the second enclosing member for providing a fluid sealing during use, and there is a sealing interface between the alternative second capsule and the second (Continued)

enclosing member for providing a fluid sealing contact during use.

35 Claims, 21 Drawing Sheets

(56) References Cited

U.S. PATENT DOCUMENTS

| | | | |
|---|---|---|---|
| 2018/0297776 A1 | 10/2018 | Dijkstra | |
| 2019/0335942 A1* | 11/2019 | Rijskamp | A47J 31/0647 |
| 2020/0391935 A1 | 12/2020 | Bambagioni | |

FOREIGN PATENT DOCUMENTS

| | | | |
|---|---|---|---|
| RU | 2568397 | 11/2015 | |
| WO | 2010137951 | 12/2010 | |
| WO | 2015092712 | 6/2015 | |
| WO | 2016186492 | 11/2016 | |
| WO | WO-2016186489 A1 * | 11/2016 | A47J 31/3623 |
| WO | WO-2018026270 A1 * | 2/2018 | A47J 31/0647 |
| WO | 2018067013 | 4/2018 | |
| WO | 2020053075 | 3/2020 | |

* cited by examiner

SYSTEM FOR PREPARING A BEVERAGE FROM A CAPSULE USING A FLUID SUPPLIED UNDER PRESSURE INTO THE CAPSULE FOR USE IN SUCH A SYSTEM

CROSS REFERENCE TO RELATED APPLICATIONS

This application is a U.S. national phase application of International Application No. PCT/NL2019/050849, filed Dec. 18, 2019, which claims benefit from the Netherlands Application 2022265, filed Dec. 20, 2018, which are each hereby incorporated herein by reference in their entirety.

FIELD OF THE INVENTION

The invention relates to a system for preparing a beverage from a capsule using a fluid supplied under pressure into the capsule. The invention also relates to a capsule for use in such a system.

BACKGROUND TO THE INVENTION

Capsules are widely used for preparing potable beverages. A beverage preparation device being arranged for receiving the capsules may be employed for brewing a potable beverage by using a fluid, such as a liquid, supplied under pressure into said capsule.

In a known system the capsule is provided with a sealing member, and the enclosing member of this known system has a sealing surface acting on the sealing member to provide interaction such as to provide a fluid tight sealing during brewing. Furthermore in the known system the enclosing member comprises a capsule holder and a manually operated or an automatic mechanism for relative displacement of the enclosing member and the capsule holder. The manually operated or automatic mechanism applies a force on the sealing member of the capsule when the enclosing member closes on the capsule holder. This force should ensure the fluid tight seal between the enclosing member and the capsule. Because the manually operated or automatic mechanism is arranged to be moved relative to the base, the sealing capabilities of the system can depend on the pressure of the fluid injected by the fluid injection means. If the pressure of the fluid increases, the force between the sealing member of the capsule and a free end of the enclosing member increases too and thereby the force between the sealing member of the capsule and the free end of the enclosing member increases also.

The sealing member of the capsule must be arranged such that upon reaching the maximum fluid pressure in the enclosing member the sealing member should still provide a fluid sealing contact between the enclosing member and the capsule. However, the sealing member must also be arranged such that prior to, or at the start of, brewing when the pressure of the fluid in the enclosing member outside the capsule is relatively low, the sealing member also provides a fluid sealing contact between the enclosing member and the capsule. If at the start of brewing, there would not exist a fluid sealing contact between the capsule and the enclosing member, leakage will occur. However, if leakage occurs there is a real chance that the pressure in the enclosing member and outside the capsule will not sufficiently increase for increasing the force on the sealing member by means of the free end of the enclosing member if the manually operated or automatic mechanism moves the enclosing member towards the capsule holder. Only if there is a sufficient initial sealing, the pressure in the enclosing member will increase whereby also the force of the free end of the enclosing member acting on the sealing member of the capsule can increase for providing a sufficient fluid sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

It follows from the above that the sealing member is a member which is very critical in design of capsules and beverage preparation apparatus. The capsule should be able to provide a fluid sealing contact between the enclosing member and the capsule, preferably even at a relatively low fluid pressure if only a relatively small force is applied on the sealing member by means of the free end of the enclosing member but it should preferably also provide a fluid sealing contact at a much higher fluid pressure in the enclosing member outside the capsule if a higher force is applied by means of the free end of the enclosing member to the sealing member of the capsule. In particular when the free contact end of the enclosing member is provided with radially extending open grooves which act as air inlet passage once the force between the enclosing member and the capsule holder is released so that it is easier for a user to take out the capsule, the sealing member must also be able to 'close off' the radially extending open grooves to provide an effective seal.

Certain capsules may have a sealing member at the outwardly extending flange for providing a fluid sealing contact with an enclosing member of the beverage preparation device if the capsule is positioned in the enclosing member and the enclosing member is closed by means of the closing member, such that the outwardly extending flange of the capsule and at least a portion of the sealing member of the capsule are sealingly engaged between the enclosing member and the closing member. The sealing member of the capsule can be integral with the outwardly extending flange and comprise at least one projection projecting from the outwardly extending flange. The at least one projection can include a projection top, and the at least one projection can be configured such that its projection top exerts a radial force on the first free contact end of the first annular element if the capsule is positioned in the first enclosing member and the first enclosing member is closed by means of the first closing member of the first beverage preparation device. Such sealing contact may provide advantageous sealing. However, the obtained sealing is very dependent on the used enclosing member.

Capsule and machine manufacturers tend to bring new products to the market on a regular basis, having new features and designs. In this way, the sealing conditions may change. For instance, a new beverage preparation device may require new capsules for obtaining an adequate sealing during brewing. There is a need for being able to handle such situations better, for instance by improving the interoperability between capsules and beverage preparation devices.

Moreover, there is a desire for users to have more choice in the selection of the beverage preparation device and/or capsule.

SUMMARY OF THE INVENTION

It is an object of the invention to provide for a method and a system that obviates at least one of the above mentioned drawbacks.

Additionally or alternatively, it is an object of the invention to provide a system in which detrimental leakage can be reduced or prevented when preparing a beverage from a capsule using a fluid supplied under pressure into the capsule.

Additionally or alternatively, it is an object of the invention to provide an improved sealing when a capsule is used in a beverage preparation apparatus.

Additionally or alternatively, it is an object of the invention to provide a system in which the interoperability between capsules and beverage preparation devices is improved.

Thereto, the invention provides for a system for preparing a potable beverage, the system comprising: a first capsule and an alternative second capsule, each containing a substance for the preparation of a potable beverage by extracting and/or dissolving the substance by means of a fluid supplied under pressure into the capsule, wherein the first capsule and the alternative second capsule each comprise an aluminum capsule body having a central capsule body axis, the aluminum capsule body being provided with a bottom, a side wall and an outwardly extending flange, and further comprise an aluminum cover attached to the outwardly extending flange, the cover hermetically closing the capsule; a first beverage preparation device including a first enclosing member for receiving either the first capsule or the alternative second capsule, wherein the first enclosing member comprises first fluid injection means for supplying fluid under pressure into the capsule received in the first enclosing member, wherein the first beverage preparation device comprises a first closing member for closing the first enclosing member, wherein the first enclosing member includes a first annular element having a first central annular element axis and a first free contact end, said first free contact end of the first annular element optionally being provided with a plurality of radially extending first open grooves; a second beverage preparation device including a second enclosing member for receiving either the first capsule or the alternative second capsule, wherein the second enclosing member comprises second fluid injection means for supplying fluid under pressure into the capsule received in the second enclosing member, wherein the second beverage preparation device comprises a second closing member for closing the second enclosing member, wherein the second enclosing member includes a second annular element having a central second annular element axis and a second free contact end, said second free contact end of the second annular element optionally being provided with a plurality of second radially extending open grooves; wherein the first capsule and the alternative second capsule each include a sealing member at the outwardly extending flange for providing a fluid sealing contact with the first enclosing member if the capsule is positioned in the first enclosing member and the first enclosing member is closed by means of the first closing member, such that the outwardly extending flange of the first capsule or alternative second capsule and at least a portion of the sealing member of the first capsule or alternative second capsule are sealingly engaged between the first enclosing member and the first closing member; wherein the sealing member of the first capsule and the alternative second capsule is integral with the outwardly extending flange and comprises at least one projection projecting from the outwardly extending flange, said at least one projection comprising a projection top, and wherein the at least one projection is configured such that its projection top exerts a radial force on the first free contact end of the first annular element if the capsule is positioned in the first enclosing member and the first enclosing member is closed by means of the first closing member of the first beverage preparation device; wherein there is no sealing interface between the first capsule and the second enclosing member for providing a fluid sealing contact if the first capsule is positioned in the second enclosing member and the second enclosing member is closed by means of the second closing member; wherein there is a sealing interface between the alternative second capsule and the second enclosing member for providing a fluid sealing contact if the alternative second capsule is positioned in the second enclosing member and the second enclosing member is closed by means of the second closing member.

Advantageously, by means of the system, compatibility may be improved. The alternative second capsule is compatible with the second beverage preparation device and may also be compatible with the first beverage preparation device. In this way, compatibility issues linked to the introduction of a second beverage preparation device may be overcome by means of the alternative second capsule. For instance, the second beverage preparation device may have been designed such that the first capsule fails in providing an adequate sealing in use during brewing. The alternative second capsule used in the second beverage preparation device may provide an adequate sealing in use, i.e. be compatible, and furthermore also be compatible with the first beverage preparation device.

The first capsule may be arranged to seal in the first beverage preparation device, but fail to seal in the second beverage preparation device. The alternative second capsule can be arranged to seal in both the first beverage preparation device and the second beverage preparation device. The first capsule may be used in the first beverage preparation device wherein in use (during brewing) the sealing is obtained by means of the sealing member, preventing leakage. However, the sealing member of the first capsule may not be suitable for providing a sealing interface or sealing contact in the second beverage preparation device. The first capsule in the second beverage preparation device may thus leak in use (during brewing).

The alternative second capsule may be arranged such that both in the first beverage preparation device and the second beverage preparation device leakage is prevented in use. For this purpose, the alternative second capsule may have an additional sealing portion, a different sealing member, a further sealing member, a seal conforming shape (e.g. arranged for sealing at a side wall), other dimensions, additional means, etc. for providing the sealing contact between the alternative second capsule and the second beverage preparation device in use.

Optionally, the alternative second capsule includes at least two sealing portions, wherein a first sealing portion is arranged for providing a first sealing interface if the alternative second capsule is positioned in the first enclosing member of the first beverage preparation device and the first enclosing member is closed by means of the first closing member, and wherein a second sealing portion is arranged for providing a second sealing interface if the alternative second capsule is positioned in the second enclosing member and the second enclosing member is closed by means of the second closing member, the first sealing interface being different from the second sealing interface.

Optionally, the first capsule has a same sealing interface as the alternative second capsule if the first capsule is positioned in the first enclosing member of the first beverage preparation device, wherein the sealing interface of the first capsule corresponds to the first sealing interface of the alternative second capsule.

Optionally, the alternative second capsule further includes an alternative sealing member for providing the second sealing interface between the alternative second capsule and the second enclosing member of the second beverage preparation device if the alternative second capsule is positioned in the second enclosing member and the second enclosing member is closed by means of the second closing member. Many variants are possible. For example, the alternative sealing member can be distanced from the sealing member, the alternative sealing member can be at a same location on the flange of the alternative second capsule, the alternative sealing member may have a different shape and/or material properties with respect to the sealing member.

The alternative sealing interface may be provided by means of an alternative sealing member arranged on the outwardly extending flange, the side wall and/or the bottom of the alternative second capsule.

Optionally, the alternative sealing member is positioned at the at least one projection of the alternative second capsule.

Optionally, the alternative sealing member is configured to be biased against and in contact with the second enclosing member.

Optionally, the alternative sealing member is elastically deformable.

Optionally, the alternative sealing member is a resilient, such as a rubber elastic, sealing member.

Optionally, the alternative sealing member forms a self-reinforcing sealing configuration when pressure is applied.

Optionally, the alternative sealing member is made of a sponge.

Optionally, the sponge is an aluminum sponge. The aluminum sponge is not only relatively easy to manufacture but in addition it can provide a satisfactory seal during use. In particular the sealing member can provide a satisfactory sealing with the free contact end provided with radially extending open grooves. In addition it is environmentally friendly if the capsule is disposed of after use. Please note that aluminum sponge is sometimes also called aluminum foam.

Optionally, the second enclosing member includes a sealing element for providing the second sealing interface between the alternative second capsule and the second enclosing member of the second beverage preparation device if the alternative second capsule is positioned in the second enclosing member and the second enclosing member is closed by means of the second closing member.

Optionally, the sealing element is configured to seal against the flange, sidewall and/or the bottom of the alternative second capsule if the capsule is positioned in the second enclosing member and the second enclosing member is closed by means of the second closing member.

Optionally, the sealing element is positioned at the second annular element of the second enclosing member.

Optionally, the sealing element is configured to be biased against and in contact with the alternative second capsule.

Optionally, the sealing element is elastically deformable.

Optionally, the sealing element forms a self-reinforcing sealing configuration when pressure is applied.

Optionally, the sealing element is made of a sponge, such as an aluminum sponge.

Optionally, the sealing element includes a resilient, such as a rubber elastic, sealing element.

Optionally, the first enclosing member contacts the at least one protrusion without sealing contact therebetween, wherein upstream and/or downstream of the at least one protrusion, a sealing member or sealing element is arranged for providing sealing contact.

The enclosing member may push against the at least one protrusion, although failing to provide sealing contact therebetween. Sealing contact may be obtained by means of an alternative sealing member or sealing element for providing sealing contact upstream and/or downstream of the at least one protrusion.

Optionally the second capsule includes a dual sealing member, wherein the dual sealing member is configured to provide a first sealing interface if the capsule is positioned in the first enclosing member of the first beverage preparation device and the first enclosing member is closed by means of the first closing member, and a different second sealing interface if the alternative second capsule is positioned in the second enclosing member and the second enclosing member is closed by means of the second closing member. Many variants are possible. For example, the first sealing interface can be distanced from the second sealing interface, the first sealing interface can be at a same location on the flange of the alternative second capsule, the second sealing interface may have a different shape and/or material properties with respect to the first sealing interface.

Optionally, the sealing member comprises a further projection projecting from the outwardly extending flange and a plateau between said two projections, wherein the distance between the two projections is such that the first free contact end of the first annular element is enclosed between the two projections if either the first capsule or the alternative second capsule is positioned in the first enclosing member and the first enclosing member is closed by means of the first closing member.

Optionally, a first one of the two projections of the sealing member projects further from a base portion of the outwardly extending flange, to which base portion the cover is attached, than a second one of the two projections of the sealing member.

Optionally, the plateau has a bottom end which is radially closer to the projection top of said second one of said projections than to the projection top of said first one of said projections.

Optionally, a first one of the two projections has a first conical sloping side surface one a side facing a second one of the two projections and the second one of the two projections has a second conical sloping side surface on a side facing the first one of the two projections, said first side surface having a greater size from its top end to its lower end than said second side surface.

Optionally, a first one of the two projections has a first conical sloping side surface one a side facing a second one of the two projections and the second one of the two projections has a second sloping side surface on a side facing the first one of the two projections, said first side surface having a conical generatrix at a first enclosed angle relative to the cover, said second side surface having a conical generatrix at a second enclosed angle relative to the cover, said first angle being smaller than said second angle.

Optionally, the first angle is between 40° and 60°, preferably larger than 45° and preferably smaller than 55°.

Optionally, the second angle is between 60° and 85°, preferably larger than 70° and preferably smaller than 80°.

Optionally, a first one of the two projections has an extreme top end extending around the capsule axis at a diameter of 31.8 to 32.0 mm and preferably 31.9 mm.

Optionally, a second one of the two projections has an extreme top end extending around the capsule axis at a diameter of 29.7 to 30.0 mm and preferably 29.8 mm.

Optionally, the first one of the two projections is an outer one of the two projections.

Optionally, the plateau is axially spaced from the cover.

Optionally, the distance between the two projections is such that the first free contact end of the first annular element is contacted by the two projections if either the first capsule or the alternative second capsule is positioned in the first enclosing member and the first enclosing member is closed by means of the first closing member.

Optionally, the two spaced projections and the plateau are arranged such that the first free contact end of the first annular element is contacted by the plateau if either the first capsule or the alternative second capsule is positioned in the first enclosing member and the first enclosing member is closed by means of the first closing member.

Optionally, the first capsule and the alternative second capsule each comprises a bearing for the first enclosing member if the capsule is positioned in the first enclosing member and the first enclosing member is closed by means of the first closing member, said bearing enclosing at least a portion of the first free contact end of the first annular element and said bearing being formed by the two projections and the plateau there between.

Optionally, the plateau is substantially flat.

Optionally, the plateau comprises a curved portion.

Optionally, the plateau is V-shaped.

Optionally, the first capsule and the alternative second capsule each contain an extractable product as substance for the preparation of a potable beverage, said extractable product preferably being 5-20 grams, preferably 5-10 grams, more preferably 5-7 grams of roasted and ground coffee.

Optionally, the outer diameter of the outwardly extending flange of the capsule is larger than the diameter of the bottom of the capsule.

Optionally, the outer diameter of the outwardly extending flange is approximately 37.1 mm and the diameter of the bottom of the capsule is about 23.3 mm.

Optionally, the thickness of the aluminum capsule body is such that it is deformed easily if the capsule is positioned in the enclosing member of the beverage preparation device and the enclosing member is closed by means of the closing member of the beverage preparation device, preferably the thickness of the aluminum capsule body is 20 to 200 micrometer, preferably 100 micrometer.

Optionally, the thickness of the aluminum cover is 15 to 65 micrometer, preferably 30-45 micrometer and more preferably 39 micrometer.

Optionally, the wall thickness of the aluminum cover is smaller than the wall thickness of the aluminum capsule body.

Optionally, the aluminum cover is arranged to tear open on the closing member of the beverage preparation device, such as an extraction plate of the beverage preparation device under the influence of fluid pressure in the capsule.

Optionally, the side wall of the aluminum capsule body has a free end opposite the bottom, the outwardly extending flange extending from said free end of the side wall in a direction at least substantially transverse to the central capsule body axis.

Optionally, the outwardly extending flange comprises a curled outer edge.

Optionally, an inner edge of the curled outer edge of the outwardly extending flange has a radius about the central capsule body axis of at least 16 mm.

Optionally, the sealing member is positioned between the free end of the side wall of the aluminum capsule body and an inner edge of the curled outer edge of the outwardly extending flange.

Optionally, the curled outer edge of the outwardly extending flange has a largest dimension of about 1.2 millimeter.

Optionally, the inner diameter of the free end of the side wall of the aluminum capsule body is about 29.5 mm Optionally, the distance between the free end of the side wall of the aluminum capsule body and an outermost edge of the outwardly extending flange is about 3.8 millimeter.

Optionally, wherein a height of the aluminum capsule body is about 28.4 mm.

Optionally, the aluminum capsule body is truncated, wherein preferably the side wall of the aluminum capsule body encloses an angle with a line transverse to the central capsule body axis of about 97.5°.

Optionally, the bottom of the aluminum capsule body has a largest inner diameter of about 23.3 mm.

Optionally, the bottom of the aluminum capsule body is truncated, preferably having a bottom height of about 4.0 mm and wherein the bottom further has a generally flat central portion opposite the cover having a diameter of about 8.3 mm.

Optionally, the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm.

Optionally, the capsule comprises an inner surface, and on the inner surface of at least the side wall of the capsule an inner coating is provided.

Optionally, the aluminum cover of the capsule is attached to the outwardly extending flange by means of a sealing lacquer, said inner coating being composed of the same material as the sealing lacquer.

Optionally, the sealing member is free from an inner coating.

Optionally, the capsule comprises an outer surface, and on the outer surface of the capsule a color lacquer is provided.

Optionally, on an outer surface of the color lacquer an outer coating is provided.

Optionally, the sealing member is free from a color lacquer.

Optionally, the at least one projection comprises a projection side wall which is inclined with regard to the outwardly extending flange of the aluminum capsule body, said projection side wall being configured such that it is deformed easily if the capsule is positioned in the enclosing member of the beverage preparation device and the enclosing member is closed by means of the closing member of the beverage preparation device.

Optionally, the distance between the projection and the side wall of the aluminum capsule body is such that the first free contact end of the first annular element is contacted by the projection and the side wall of the aluminum capsule body if either the first capsule or the alternative second capsule is positioned in the first enclosing member of the first beverage preparation device and the first enclosing member is closed by means of the first closing member of the first beverage preparation device.

Optionally, the sealing member in addition to the at least one projection projecting from the outwardly extending flange comprises a plateau between the projection top and the side wall of the aluminum capsule body.

Optionally, a bearing is formed by the projection, plateau and the side wall of the aluminum capsule body, wherein the distance between the projection and the side wall is such that the first free contact end of the first annular element is enclosed by the projection and the side wall of the aluminum capsule body if either the first capsule or the alternative second capsule is positioned in the first enclosing member of the first beverage preparation device and the first enclosing member is closed by means of the first closing member of the first beverage preparation device.

Optionally, the projection, the side wall of the aluminum capsule body and the plateau are arranged such that the first free contact end of the first annular element is contacted by the plateau if either the first capsule or the alternative second capsule is positioned in the first enclosing member of the first beverage preparation device and the first enclosing member is closed by means of the first closing member of the first beverage preparation device.

Optionally, the sealing member includes a sealing structure.

Optionally, the sealing structure is deformable such that said sealing member fluid sealingly contacts at least a portion of the first free contact end of the first annular element if, in use, the maximum fluid pressure in the first enclosing member of the first beverage preparation device is in the range of 6-20 bar, preferably between 12 and 18 bar.

Optionally, the sealing structure is deformable such that said sealing member fluid sealingly contacts at least a portion of the first free contact end of the first annular element if, during brewing, said first free contact end of the first annular element exerts a force F2 on the sealing structure of either the first capsule or the alternative second capsule, wherein F2 is in the range of 500-1500 N preferably in the range of 750-1250 N when the fluid pressure P2 in said first enclosing member outside the capsule is in the range of 6-20 bar, preferably between 12 and 18 bar.

Optionally, the sealing structure is deformable such that said sealing member fluid sealingly contacts at least a portion of the first free contact end of the first annular element if, in use, prior to or at the start of brewing, said first free contact end of the first annular element exerts a force F1 on the sealing structure of either the first capsule or the alternative second capsule, wherein the force F1 is in the range of 30-150 N, preferably 40-150 N and more preferably 50-100N, when the fluid pressure P1 in the first enclosing member of the first beverage preparation device outside the capsule is in the range of 0.1-4 bar, preferably 0.1-1 bar.

Optionally, the sealing structure is deformable such that said sealing member fluid sealingly contacts at least a portion of the first free contact end of the first annular element if the first free contact end of the first annular element that is pressed against the sealing structure has a plurality of radially extending open grooves uniformly spaced relative to each other in circumferential sense of said first free contact end of the first annular element.

Optionally, the sealing structure is deformable such that said sealing member sealingly contacts at least a portion of the free contact end of the annular element if the greatest width of each of said grooves is 0.9-1.1 mm, preferably 0.95 to 1.05 mm, more preferably 0.98 to 1.02 mm wherein a maximal height of each of said grooves in an axial direction of the enclosing member of the beverage preparation device is 0.01-0.09 mm, preferably 0.03 to 0.07 mm, more preferably 0.045 to 0.055 mm, most preferred 0.05 mm and wherein the number of said grooves is 90 to 110, preferably 96.

Optionally, the sealing structure and the remainder of the capsule body are made of the same plate material.

According to an aspect, the invention provides for system for preparing a potable beverage, the system comprising: a multi-seal capsule containing a substance for the preparation of a potable beverage by extracting and/or dissolving the substance by means of a fluid supplied under pressure into the multi-seal capsule, wherein the multi-seal capsule comprises an aluminum capsule body having a central capsule body axis, the aluminum capsule body being provided with a bottom, a side wall and an outwardly extending flange, and further comprises an aluminum cover attached to the outwardly extending flange, the cover hermetically closing the multi-seal capsule; a first beverage preparation device including a first enclosing member for receiving the multi-seal capsule, wherein the first enclosing member comprises first fluid injection means for supplying fluid under pressure into the multi-seal capsule received in the first enclosing member, wherein the first beverage preparation device comprises a first closing member for closing the first enclosing member, wherein the first enclosing member includes a first annular element having a first central annular element axis and a first free contact end, said first free contact end of the first annular element optionally being provided with a plurality of radially extending first open grooves; a second beverage preparation device including a second enclosing member for receiving the multi-seal capsule, wherein the second enclosing member comprises second fluid injection means for supplying fluid under pressure into the multi-seal capsule received in the second enclosing member, wherein the second beverage preparation device comprises a second closing member for closing the second enclosing member, wherein the second enclosing member includes a second annular element having a central second annular element axis and a second free contact end, said second free contact end of the second annular element optionally being provided with a plurality of second radially extending open grooves; wherein the multi-seal capsule includes a sealing member at the outwardly extending flange for providing a fluid sealing contact with the first enclosing member if the capsule is positioned in the first enclosing member and the first enclosing member is closed by means of the first closing member, such that the outwardly extending flange of the multi-seal capsule and at least a portion of the sealing member of the multi-seal capsule are sealingly engaged between the first enclosing member and the first closing member; wherein the sealing member of the multi-seal capsule is integral with the outwardly extending flange and comprises at least one projection projecting from the outwardly extending flange, said at least one projection comprising a projection top, and wherein the at least one projection is configured such that its projection top exerts a radial force on the first free contact end of the first annular element if the capsule is positioned in the first enclosing member and the first enclosing member is closed by means of the first closing member of the first beverage preparation device; wherein there is a first sealing interface between the multi-seal capsule and the first enclosing member for providing a fluid sealing contact if the multi-seal capsule is positioned in the first enclosing member and the first enclosing member is closed by means of the first closing member; wherein there is a second sealing interface, different from the first sealing interface, between the multi-seal capsule and the second enclosing member for providing a fluid sealing contact if the multi-seal capsule is positioned in the second enclosing member and the second enclosing member is closed by means of the second closing member.

For example, the second beverage preparation device may be different with respect to the first beverage preparation device, such that the first sealing interface does not enable sealing (during brewing) in the second beverage preparation device, wherein the second sealing interface does enable sealing (during brewing) in the second beverage preparation device. Additionally, the multi-seal capsule may be arranged to enable sealing in the first beverage preparation device at the first sealing interface and optionally not at the second sealing interface. Hence, the multi-seal capsule may be compatible with both the first beverage preparation device and the second beverage preparation device providing an adequate sealing in use. The multi-seal capsule can correspond to the alternative second capsule.

It will be appreciated that the multi-seal capsule may be a dual-seal capsule. A triple-seal, quadruple-seal, etc. capsule is also envisaged.

Optionally, the alternative second capsule has one or two sealing members. In an example, both the first capsule and the alternative second capsule have a same first sealing member arranged to provide a sealing action in the first beverage preparation device, wherein the alternative second capsule has an additional sealing member configured to provide a sealing action in the second beverage preparation device.

Optionally, the first capsule and the alternative second capsule have a different sealing member, wherein the sealing member of the first capsule is arranged to provide a sealing action in the first beverage preparation device and not in the second beverage preparation device, and wherein the sealing member of the alternative second capsule is arranged to provide a sealing action if used in one of the first beverage preparation device and the second beverage preparation device. The alternative second capsule may have a back-compatibility with the first beverage preparation device, while also suitable for providing the required sealing action in the second beverage preparation device for avoiding leakage.

According to an aspect, the system comprises the first beverage preparation device, the second beverage preparation device, and a multi-seal capsule wherein the capsule comprises a first seal arranged for providing sealing (during brewing) in the first beverage preparation device, optionally also in the second beverage preparation device, optionally a second seal arranged for providing sealing (during brewing) in the second beverage preparation device if the first seal does not provide sealing (during brewing) in the second beverage preparation device.

It will be appreciated that it is also envisioned that any one of the first or second beverage preparation device has two or more brew chambers each for receiving either the first capsule or the alternative second capsule. A plurality of enclosing members may be arranged for this purpose. It may be possible that the first beverage preparation device and/or the second beverage preparation device is arranged for receiving two or more capsules at the same time, with each enclosing member of the plurality of enclosing members of the first beverage preparation device and/or the second beverage preparation device being arranged to receive only one of either the first capsule or the alternative second capsule.

According to an aspect, the invention provides for a multi-seal capsule containing a substance for the preparation of a potable beverage by extracting and/or dissolving the substance by means of a fluid supplied under pressure into the multi-seal capsule, wherein the multi-seal capsule comprises an aluminum capsule body having a central capsule body axis, the aluminum capsule body being provided with a bottom, a side wall and an outwardly extending flange, and further comprises an aluminum cover attached to the outwardly extending flange, the cover hermetically closing the multi-seal capsule; wherein the multi-seal capsule is arranged for being receivable in a first beverage preparation device including a first enclosing member for receiving the multi-seal capsule, wherein the first enclosing member comprises first fluid injection means for supplying fluid under pressure into the multi-seal capsule received in the first enclosing member, wherein the first beverage preparation device comprises a first closing member for closing the first enclosing member, wherein the first enclosing member includes a first annular element having a first central annular element axis and a first free contact end, said first free contact end of the first annular element optionally being provided with a plurality of radially extending first open grooves; wherein the multi-seal capsule is arranged for being receivable in a second beverage preparation device including a second enclosing member for receiving the multi-seal capsule, wherein the second enclosing member comprises second fluid injection means for supplying fluid under pressure into the multi-seal capsule received in the second enclosing member, wherein the second beverage preparation device comprises a second closing member for closing the second enclosing member, wherein the second enclosing member includes a second annular element having a central second annular element axis and a second free contact end, said second free contact end of the second annular element optionally being provided with a plurality of second radially extending open grooves; wherein the multi-seal capsule includes a sealing member at the outwardly extending flange for providing a fluid sealing contact with the first enclosing member if the capsule is positioned in the first enclosing member and the first enclosing member is closed by means of the first closing member, such that the outwardly extending flange of the multi-seal capsule and at least a portion of the sealing member of the multi-seal capsule are sealingly engaged between the first enclosing member and the first closing member; wherein the sealing member of the multi-seal capsule is integral with the outwardly extending flange and comprises at least one projection projecting from the outwardly extending flange, said at least one projection comprising a projection top, and wherein the at least one projection is configured such that its projection top exerts a radial force on the first free contact end of the first annular element if the capsule is positioned in the first enclosing member and the first enclosing member is closed by means of the first closing member of the first beverage preparation device; wherein there is a first sealing interface between the multi-seal capsule and the first enclosing member for providing a fluid sealing contact if the multi-seal capsule is positioned in the first enclosing member and the first enclosing member is closed by means of the first closing member; wherein there is a second sealing interface, different from the first sealing interface, between the multi-seal capsule and the second enclosing member for providing a fluid sealing contact if the multi-seal capsule is positioned in the second enclosing member and the second enclosing member is closed by means of the second closing member.

According to an aspect of the invention, the system includes the first beverage preparation device, the second beverage preparation device, the first capsule, and the alternative second capsule.

According to an aspect of the invention, the system includes the first beverage preparation device, the second beverage preparation device, and the first capsule.

According to an aspect of the invention, the system includes the first beverage preparation device, the second beverage preparation device, and the alternative second capsule.

According to an aspect of the invention, the system includes the first beverage preparation device, the first capsule, and the alternative second capsule.

According to an aspect of the invention, the system includes the second beverage preparation device, the first capsule, and the alternative second capsule.

According to an aspect of the invention, the system includes the first beverage preparation device, and the alternative second capsule.

According to an aspect of the invention, the system includes the second beverage preparation device, and the first capsule.

According to an aspect of the invention, the system includes the second beverage preparation device, and the alternative second capsule.

According to an aspect of the invention is provided a kit including the first capsule, and the alternative second capsule.

According to an aspect of the invention is provided the second beverage preparation device.

According to an aspect of the invention is provided the alternative second capsule.

According to an aspect is provided a method for preparing, e.g. a single serving of, a potable beverage using a system as described herein.

It will be appreciated that any of the aspects, features and options described in view of the system apply equally to the method and the described capsules and beverage preparation device. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
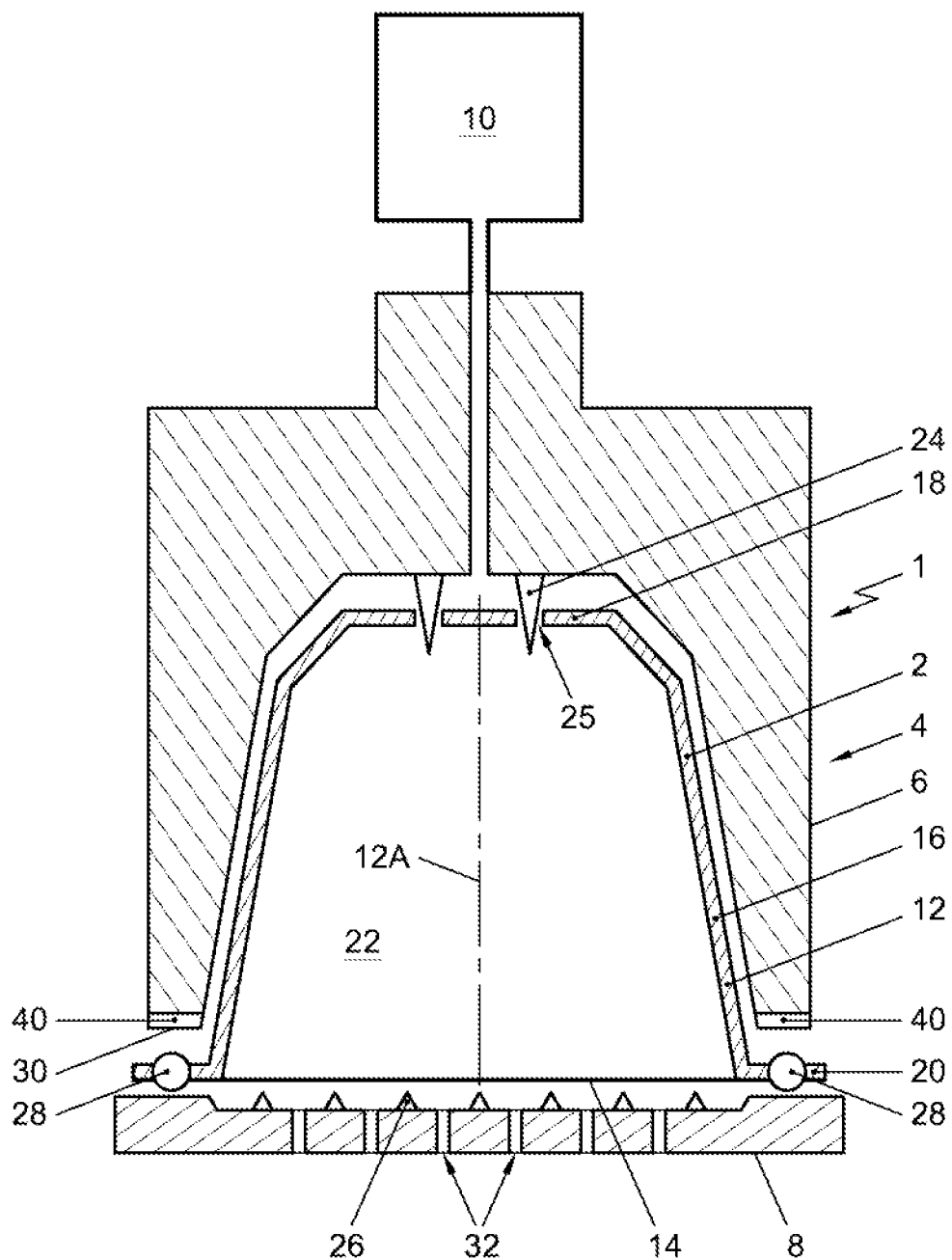
FIG. 1 shows in cross section a schematic diagram of an embodiment of a system.

FIG. 1 shows a schematic representation, in cross sectional view, of an exemplary embodiment of a system 1 for preparing a potable beverage from a capsule using a fluid supplied under pressure into the capsule. The system 1 comprises a capsule 2, and a beverage preparation device 4. The device 4 comprises enclosing member 6 for holding the capsule 2. The device 4 further comprises a closing member, such as an extraction plate, 8 for supporting the capsule 2.

In FIG. 1, a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The beverage preparation device 4 further comprises a fluid injection means 10 for supplying an amount of a fluid, such as water, under a pressure in the range of 6-20 bar, preferably between 12 and 18 bar, to the exchangeable capsule 2.

In the example shown in FIG. 1, the exchangeable capsule 2 comprises an aluminum capsule body 12 having a central capsule body axis 12A and an aluminum cover 14. In the present context, the meaning of 'aluminum' is understood to also include aluminum alloy. In this example, the aluminum capsule body 12 comprises a side wall 16, a bottom 18 closing the side wall 16 at a first end, and a outwardly extending flange 20 extending outwardly of the circumferential wall 16 at a second end opposite the bottom 18. The side wall 16, the bottom 18 and the cover 14 enclose an inner space 22 comprising a substance for the preparation of a potable beverage by extracting and/or dissolving the substance. Preferably the substance is an extractable product for the preparation of a potable beverage, the extractable product preferably being 5-20 grams, preferably 5-10 grams, more preferably 5-7 grams of roasted and ground coffee for the preparation of a single serving of a beverage. The capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises cover piercing means 26, here embodied as protrusions of the closing member 8, for piercing the cover 14 of the capsule 2. The cover piercing means 26 may be arranged to tear the cover 14 once a (fluid) pressure inside the inner space 22 exceeds a threshold pressure and presses the cover 14 against the cover piercing means 26 with sufficient force. The aluminum cover 14 thus is arranged to tear open on the closing member 8 of the beverage preparation device under the influence of fluid pressure in the capsule.

Figure 3A:
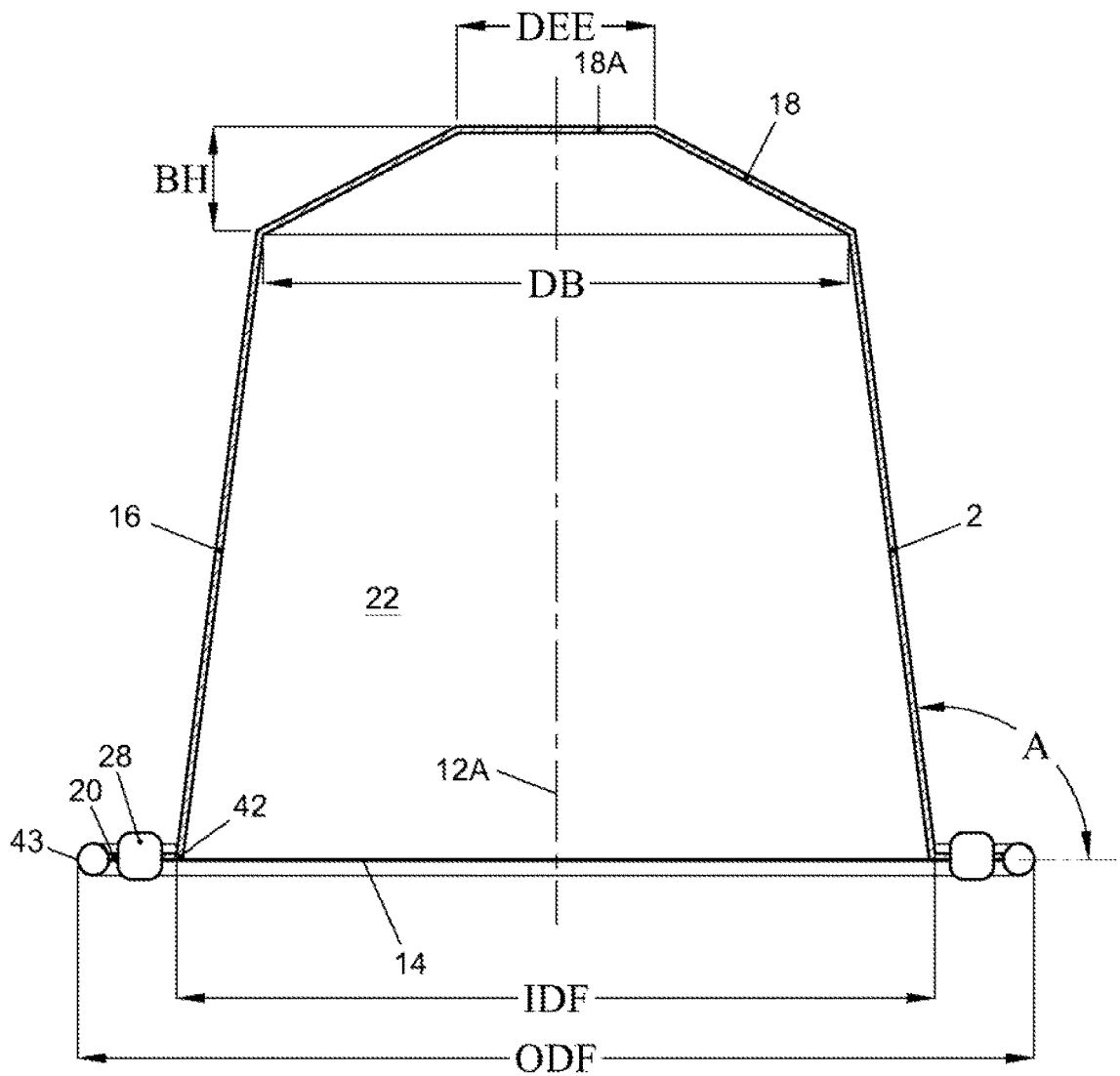
FIGS. 3a and 3b show in cross section an embodiment of a capsule before use.
Figure 3B:
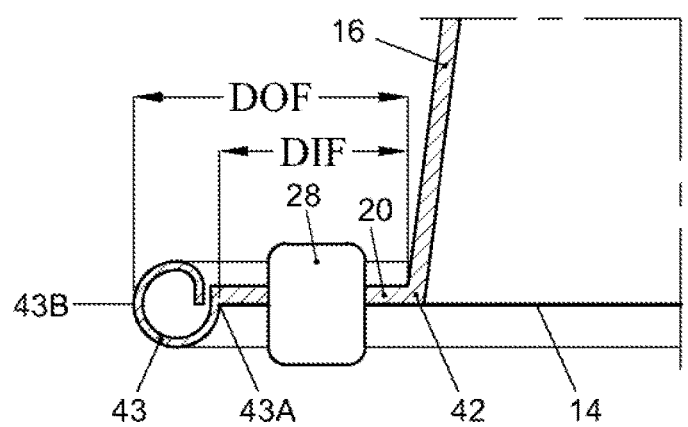
Figure 4:
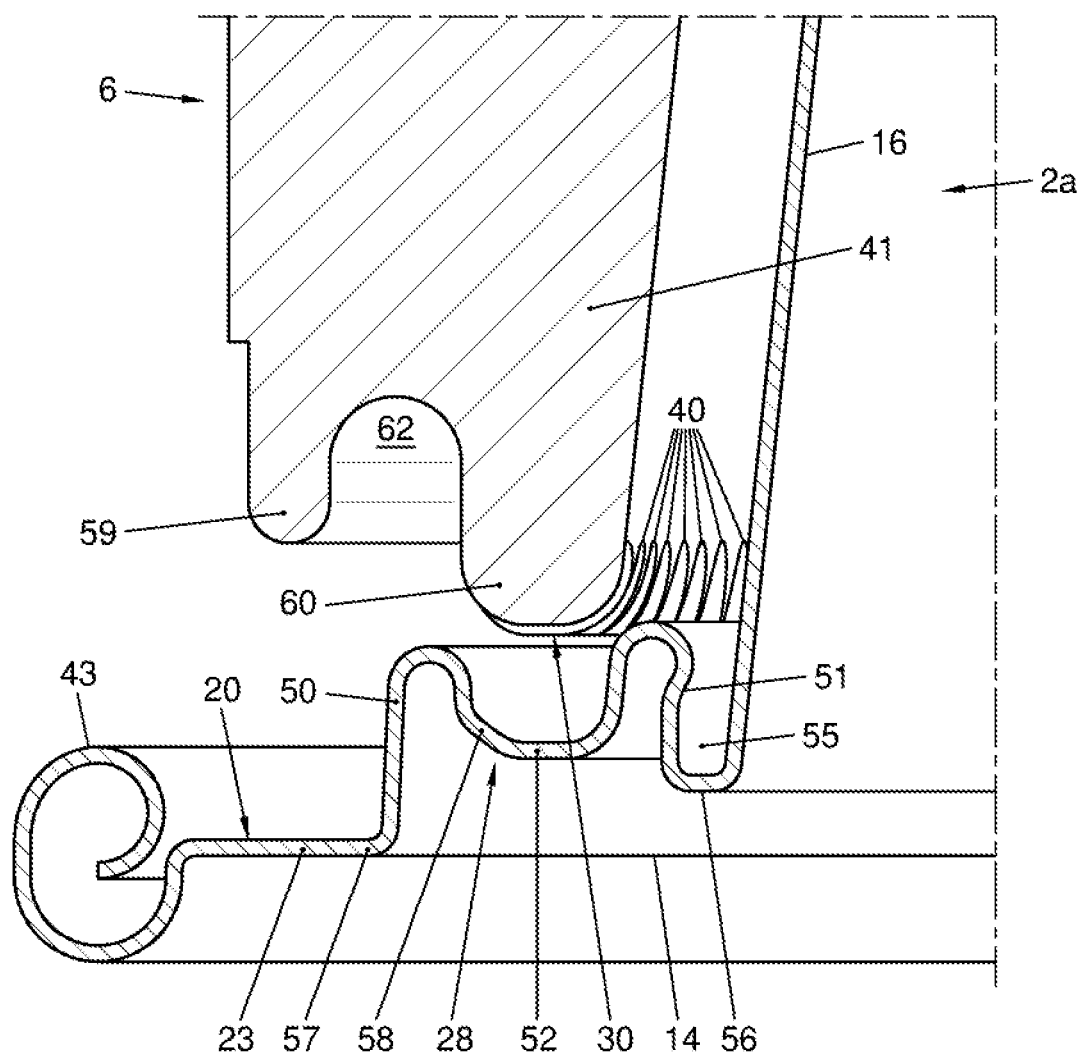
FIG. 4 shows in cross section a schematic diagram of a system.

The capsule 2 further comprises a sealing member 28 integral with the outwardly extending flange, in FIGS. 1, 3A and 3B indicated as a general box but more detailed described with regard to FIG. 4, which sealing member 28 is arranged for providing a fluid sealing contact with the enclosing member 6 if the capsule 2 is positioned in the enclosing member 6 and the enclosing member 6 is closed by means of the extraction plate 8, such that the outwardly extending flange 20 of the capsule 2 and at least a portion of the sealing member 28 are sealingly engaged between the enclosing member 6 and the extraction plate 8. This means that a fluid sealing contact between the sealing member and the free contact end is established.

Figure 2:
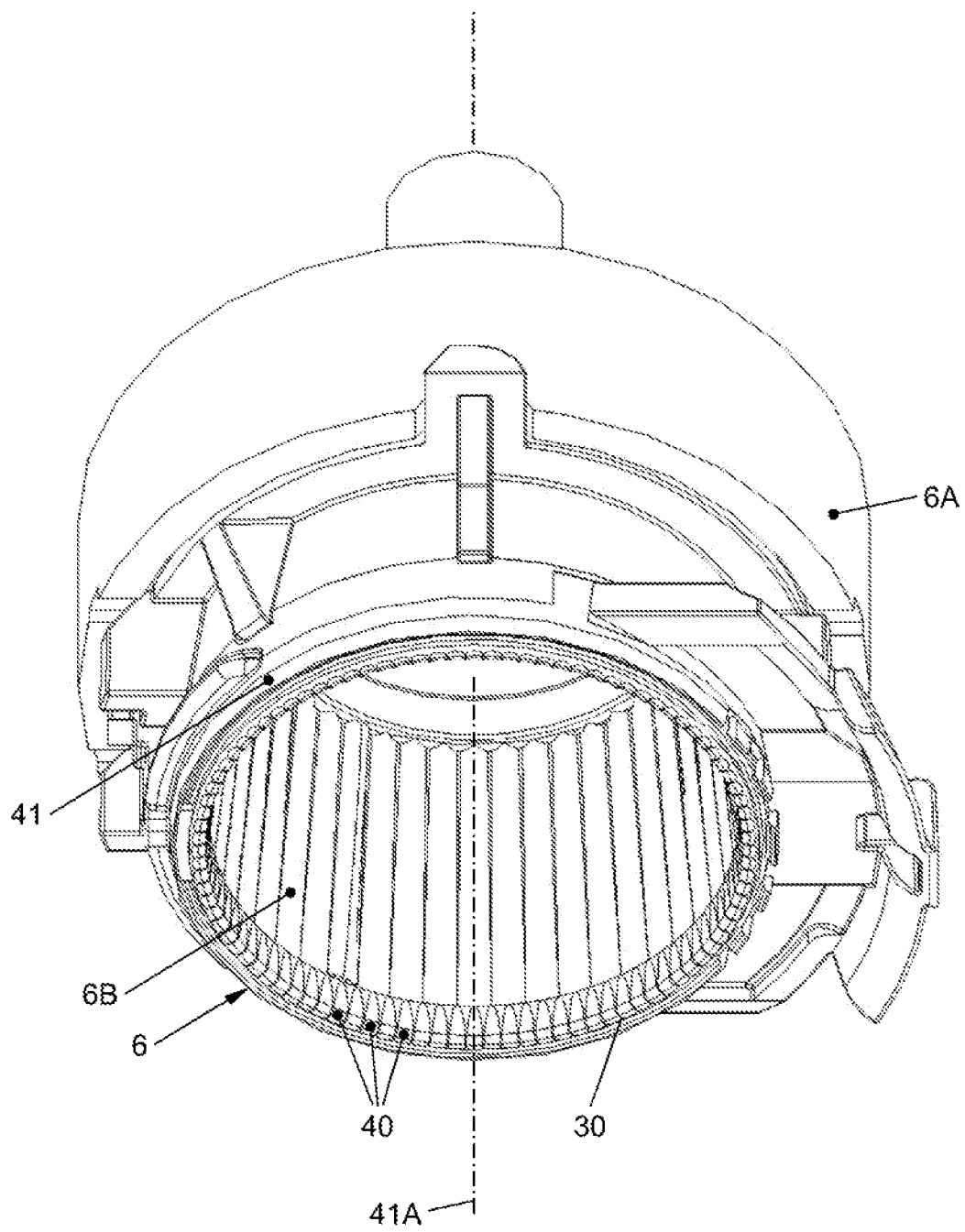
FIG. 2 shows in a perspective view an embodiment of a beverage preparation device of a system showing the free contact end of the enclosing member of the beverage preparation device with the plurality of radially extending open grooves.

FIG. 2 shows an example of the enclosing member 6 of the beverage preparation device comprising an annular element 41 having a central annular element axis 41A and a free contact end 30. The free contact end 30 of the annular element 41 is provided with a plurality of radially extending open grooves 40. The plurality of radially extending open grooves 40 are uniformly spaced relative to each other in tangential direction of the free contact end 30 of the annular element 41. The longest tangential width of each groove 40 is 0.9-1.1 mm, preferably 0.95 to 1.05 mm, more preferably 0.98 to 1.02 mm, wherein a maximal height of each groove 40 in an axial direction of the enclosing member 6 is 0.01-0.09 mm, preferably 0.03 to 0.07 mm, more preferably 0.045 to 0.055 mm, and most preferred 0.05 mm. The number of grooves 40 lies in the range of 90 to 110, preferably 96. Usually, the radial width of the free end at the location of the grooves is 0.05-0.9 mm, more specifically 0.2-0.7 mm, more specifically 0.3-0.55 mm.

An exemplary embodiment of a capsule according to the invention is shown more detailed in FIGS. 3A and 3B. In the shown embodiment the outer diameter ODF of the outwardly extending flange 20 is larger than the diameter DB of the bottom 18 of the capsule 2. In the shown embodiment the outer diameter ODF of the outwardly extending flange 20 is approximately 37.1 mm and the diameter DB of the bottom 18 is about 23.3 mm. The thickness of the aluminum capsule body 12 is such that it is deformed easily if the capsule is positioned in the enclosing member of the beverage preparation device and the enclosing member is closed by means of a closing member of the beverage preparation device, preferably the thickness of the aluminum capsule body is 100 micrometer, but in other embodiments the thickness can be 20 to 200 micrometer.

In the shown embodiment, the wall thickness of the aluminum cover 14 is 39 micrometer. The wall thickness of the aluminum cover 14 is preferably smaller than the thickness of the aluminum capsule body 12.

The side wall 16 of the aluminum capsule body 12 has a free end 42 opposite the bottom 18. The inner diameter IDF of the free end 42 of the side wall 16 of the aluminum capsule body 12 is about 29.5 mm. The outwardly extending flange 20 extends from that free end 42 in a direction at least substantially transverse to the central capsule body axis 12A. The outwardly extending flange 20 comprises a curled outer edge 43 which is beneficial for obtaining a seal between the capsule and the enclosing member. In the shown embodiment the curled outer edge 43 of the outwardly extending flange 20 has a largest dimension of about 1.2 millimeter. The distance DIF between the free end 42 of the side wall 16 of the aluminum capsule body 12 and an inner edge 43A of the curled outer edge 43 is about 2.7 mm, while the distance DOF between the free end 42 of the side wall 16 of the aluminum capsule body 12 and an outermost edge 43B of the outwardly extending flange 20 is about 3.8 millimeter. The radius about the central capsule body axis of the inner edge 43A of the curled outer edge 43 is preferably at least 16 mm.

As shown in FIGS. 3A and 3B the sealing member 28 is positioned between the free end of the side wall 16 of the aluminum capsule body 12 and the inner edge 43A of the curled outer edge 42 of the outwardly extending flange. The sealing member 28 is indicated as a general box, but will be described in more detail below. Irrespective of the embodiment of the sealing member 28 the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm for providing a correct seal.

As can be seen from FIG. 3A, the aluminum capsule body 12 is truncated. In the embodiment shown, the side wall 16 of the aluminum capsule body 12 encloses an angle A with a line transverse to the central capsule body axis 12A of about 97.5°. The bottom 18 of the aluminum capsule body 12 has a largest inner diameter DB of about 23.3 mm. The bottom 18 of the aluminum capsule body 12 is also truncated, and in the shown embodiment has a bottom height BH of about 4.0 mm. The bottom 18 further has a generally flat central portion 18A opposite the cover 14, which central portion 18A has a diameter DEE of about 8.3 mm and in which central portion 18. The entrance opening(s) 25 may be made. The entrance openings may also be made in the truncated portion between the central portion 18A and the side wall 16. The total height TH of the aluminum capsule body 12 of the capsule is about 28.4 mm.

The system 1 shown in FIG. 1 is operated as follows for preparing a cup of a potable beverage, in the present example coffee, wherein the substance is roasted and ground coffee.

The capsule 2 is placed in the enclosing member 6. The extraction plate 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the cover 14 to deform and be pressed against the lid piercing means 26 of the extraction plate.

Once the pressure reaches a certain level, the tear strength of the cover 14 will be surpassed and the cover 14 will rupture against the lid piercing means 26, creating exit openings. The prepared coffee will drain from the capsule 2 through the exit openings and outlets 32 (see FIG. 1) of the extraction plate 8, and may be supplied to a container such as a cup (not shown).

The system 1 is arranged such that prior to or at the start of brewing, the free end 30 of the enclosing member 6 exerts a force F1 on the sealing member 28 of the capsule 2 to provide a fluid sealing contact between the outwardly extending flange 20 of the capsule 2 and the enclosing member 6 of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar. During brewing, the free end 30 of the enclosing member 6 exerts a force F2 on the sealing member 28 of the capsule 2 to provide a fluid sealing contact between the outwardly extending flange 20 of the capsule 2 and the enclosing member 6, wherein the force F2 is in the range of 500-1500 N, preferably in the range of 750-1250 N, when the fluid pressure P2 in the enclosing member 6 of the beverage preparation device outside the capsule 2 is in the range of 6-20 bar, preferably between 12 and 18 bar. In the shown embodiment the free contact end of enclosing member 6 can move relative to the extracting plate 8 under the effect of the pressure of the fluid in the enclosing member 6 device towards the extraction plate 8 for applying the maximum force F2 between the outwardly extending flange 20 and the free end 30 of the enclosing member 6. This movement can take place during use, i.e. in particular at the start of brewing and during brewing. The enclosing member 6 has a first part 6A and a second part 6B wherein the second part comprises the free contact end 30. The second part 6B can move relative to the first part 6A between a first and second position. The second part 6B can move from the first positon towards the second position in the direction of the closing member 8 under the influence of fluid pressure in the enclosing member 6. The force F1 as discussed above may be reached if the second part 6B is in the first position with a fluid pressure P1. The force F2 as discussed above may be reached if the second part 6B is moved towards the second position under the influence of the fluid pressure P2 in the enclosing member 6.

As a result of the force applied the sealing member 28 of the capsule undergoes a plastic deformation and closely conforms to the grooves 40 of the free contact end 30 and thus provides a fluid sealing contact between the enclosing member 6 and the capsule 3 at a relatively low fluid pressure during start up of brewing but also provides a fluid sealing contact at the much higher fluid pressure in the enclosing member outside the capsule during brewing. This close conformation to the grooves 40 of the enclosing member is can result in the outwardly extending flange 20 comprising deformations 40' which conform to the grooves 40 of the enclosing member.

FIG. 4 shows in cross section a schematic diagram of an exemplary system as described in relation to FIGS. 1-3 with a first preparation device and a first capsule 2a. The first capsule 2a comprises a sealing member 28 at the outwardly extending flange 20 of the capsule 2a. The first beverage preparation device includes a first enclosing member 6 having a first annular element 41 having a first free contact end 30 with a plurality of radially extending open grooves 40 of which some are shown in FIG. 4.

The sealing member 28 has two spaced projections 50 and 51, each projecting axially from a base portion 23 of the outwardly extending flange 20, to which base portions 21, 23 the cover 14 is attached, in a direction away from the cover 14. A plateau 52 having a rounded bottom is located between the two projections 50 and 51.

A first one of the two projections 51 projects further from a base portion 23 of the outwardly extending flange 20 than a second one of the two projections 50. It will be appreciated that this is optional and other configurations of the projections 50, 51 is possible.

Furthermore, in this example, a bottom 56 of an annular through 55 between the inner projection 51 and the side wall 16 is axially spaced from the base portion 23 to which base portion the cover is attached. Preferably, the axial distance from the bottom 56 to the cover is smaller than the axial distance from the plateau 52 to the cover 14.

When the first enclosing member 6 and/or the first closing member 8 is moved towards the other with the sealing member 28 of the first capsule 2a in between, the free contact end 30 of the annular element 41 may first contact the first one of the two projections 51 and subsequently contacts the second one of the two projections.

If and when the free contact end 30 of the annular element 41 contacts the inner one of the two projections 51, the capsule 2a is centered relative to the first enclosing member 6. Moreover, if the inner one of the two projections 51 is radially too far to the outside, for instance locally due to non-circularity or off-centered positioning of the capsule, or generally due to the free contact area having a relatively small diameter, the free contact end urges the inner one of the two projections 51 radially inwardly. The outer one of the two projections is thereby entrained inwardly, so that a reliable firm sealing pressure is exerted onto the outer one of the two projections 50 in spite of the relatively small deformability of that outer projection 51 due to its smaller height. The relatively large stiffness of the outer one of the two projections 50, allows a large contact three to be exerted as it is deformed, the relatively high counter pressure provides a particularly reliable seal with high pressure resistance. Also, the outer one of the two projections 50 is then urged outwardly, which load is counteracted by hoop stress in the outer one of the two projections, which is evenly distributed circumferentially so that an evenly distributed sealing pressure is achieved.

The first free contact end 30 of the annular element 41 has an inner circumferential surface portion 71 contacting the inner projection 51 and an outer circumferential surface portion 70 contacting the outer projection 50. The radially extending open grooves 40 are deeper in the inner surface portion 71 than in the outer surface portion 70 or the grooves may be absent in the outer surface portion 70. Thus, the smaller, relatively stiff outer projection 50 is firmly and accurately pressed against the relatively smooth outer surface portion 70 of the free contact end 30.

The distance between the two projections 50 and 51 is such that ultimately the free contact end 30 of the annular element 41 is squeezed between converging surfaces of the two projections 50 and 51 when the first enclosing member is fully closed by means of the first closing member.

The plateau 52 is axially spaced from the cover 14. This allows the plateau 52 between the projections 50, 51 to be displaced in the direction of relative movement of the free end 30 of the annular element 41 as the enclosing member 6 is closed, urging the projections 50, 51 to be tilted and roll off inwardly against the free end 30 of the annular element 41 as the first enclosing member 6 is closed. This increases the radial sealing pressure that is exerted (in addition to the axial closing pressure), so that an increased sealing pressure is available for providing a satisfactory seal.

As shown in FIGS. 1-4, sealing can be obtained under influence of forces and pressures. It will be appreciated that this concept is also valid for other embodiments, for instance as shown in FIGS. 5-23.

Figure 5A:
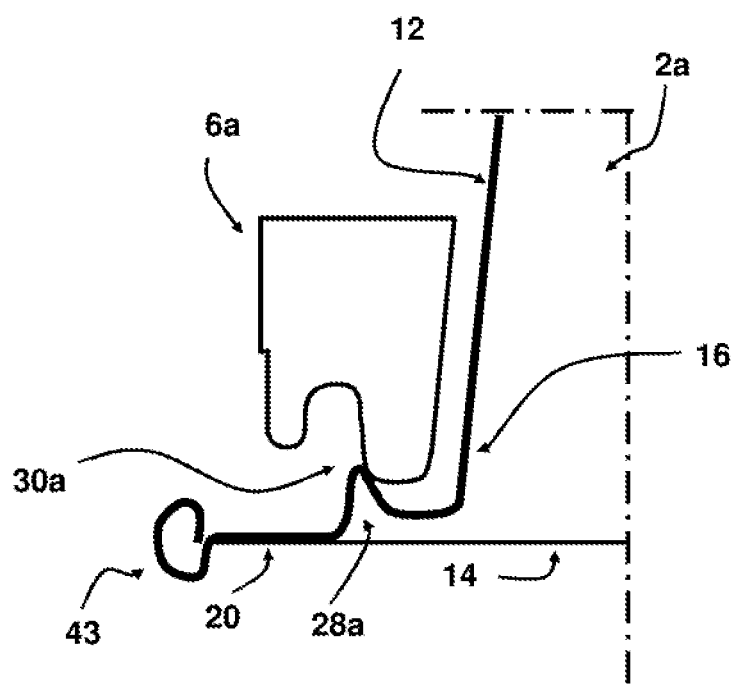
FIGS. 5a and 5b show in cross section a schematic diagram of a system.
Figure 5B:
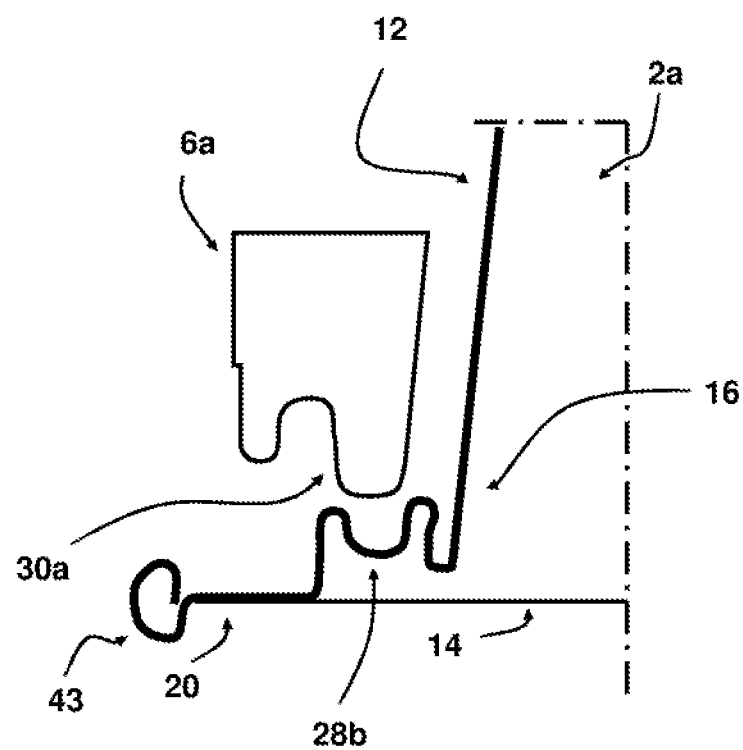

FIGS. 5a and 5b each show in cross section a schematic diagram of an example of a system for preparing a potable beverage. The system comprises a first capsule 2a containing a substance for the preparation of a potable beverage by extracting and/or dissolving the substance by means of a fluid supplied under pressure into the first capsule 2a. The first capsule 2a comprises an aluminum capsule body having a central capsule body axis, the aluminum capsule body being provided with a bottom, a side wall 16 and an outwardly extending flange 20, and further comprise an aluminum cover 14 attached to the outwardly extending flange 20, the cover 14 hermetically closing the first capsule 2a. The shown systems in FIGS. 5a and 5b further include a first beverage preparation device including a first enclosing member 6a for receiving the first capsule 2a or an alternative second capsule (not shown). The first enclosing member 6a can comprise first fluid injection means for supplying fluid under pressure into the capsule received in the first enclosing member 6a, wherein the first beverage preparation device comprises a first closing member (not illustrated) for closing the first enclosing member 6a, wherein the first enclosing member 6a includes a first annular element having a first central annular element axis and a first free contact end 30a, said first free contact end 30a of the first annular element optionally being provided with a plurality of radially extending first open grooves.

Both the first capsules 2a of the embodiment shown in FIGS. 5a and 5b can be used in the first beverage preparation device having the first enclosing member 6a.

The first capsules 2a shown in FIG. 5a, 5b, each include a sealing member 28a, 28b, respectively, at the outwardly extending flange 20 for providing a fluid sealing contact with the first enclosing member 6a of the first beverage preparation device if the capsule 2a is positioned in the first enclosing member 6a and the first enclosing member 6a is closed by means of the first closing member of the first beverage preparation device, such that the outwardly extending flange 20 of the first capsule 2a and at least a portion of the sealing member 28a, 28h of the first capsule 2a are sealingly engaged between the first enclosing member 6a and the first closing member. The sealing member 28a, 28b of the first capsule 2a is integral with the outwardly extending flange 20 and comprises at least one projection projecting from the outwardly extending flange, said at least one projection comprising a projection top, and wherein the at least one projection is configured such that its projection top exerts a radial force on the first free contact end 30a of the first annular element if the capsule is positioned in the first enclosing member 6a and the first enclosing member 6a is closed by means of the first closing member of the first beverage preparation device.

The first beverage preparation device and first capsule are arranged such that there is a sealing interface between the first capsule 2a and the first enclosing member 6a, for providing a fluid sealing contact if the first capsule 2a is positioned in the first enclosing member 2a and the first enclosing member 6a is closed by means of the first closing member of the first beverage preparation device.

Now exemplary embodiments of an alternative second capsule 2b including an alternative sealing member 100 at the alternative second capsule 2b will be described. In FIGS. 6-13, elements having the same function and structure as those of the systems shown in any one of the FIGS. 1-5 is given by identical or similar numerals, and a detailed explanation as to these elements will be omitted.

Figure 6A:
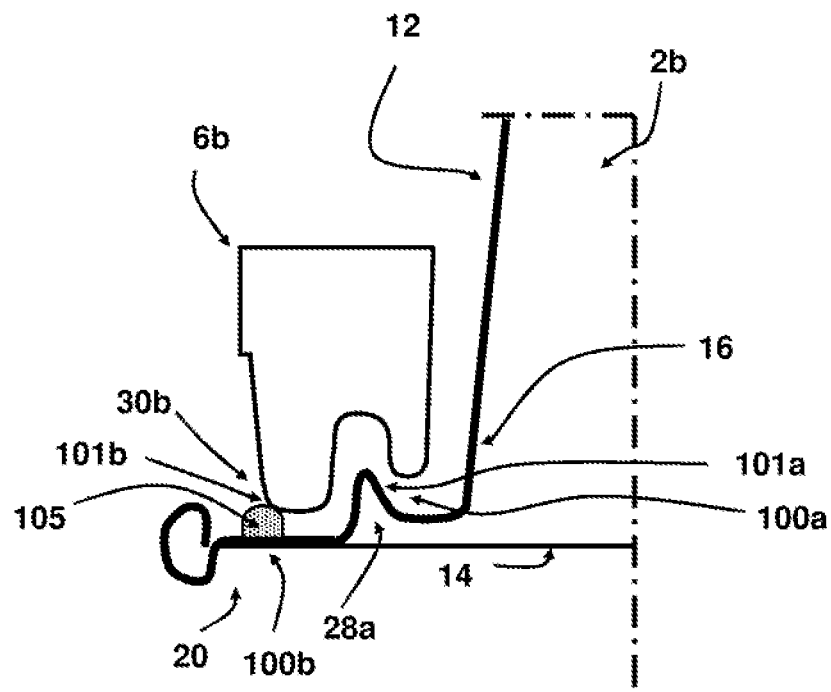
FIGS. 6a and 6b show in cross section a schematic diagram of a system.
Figure 6B:
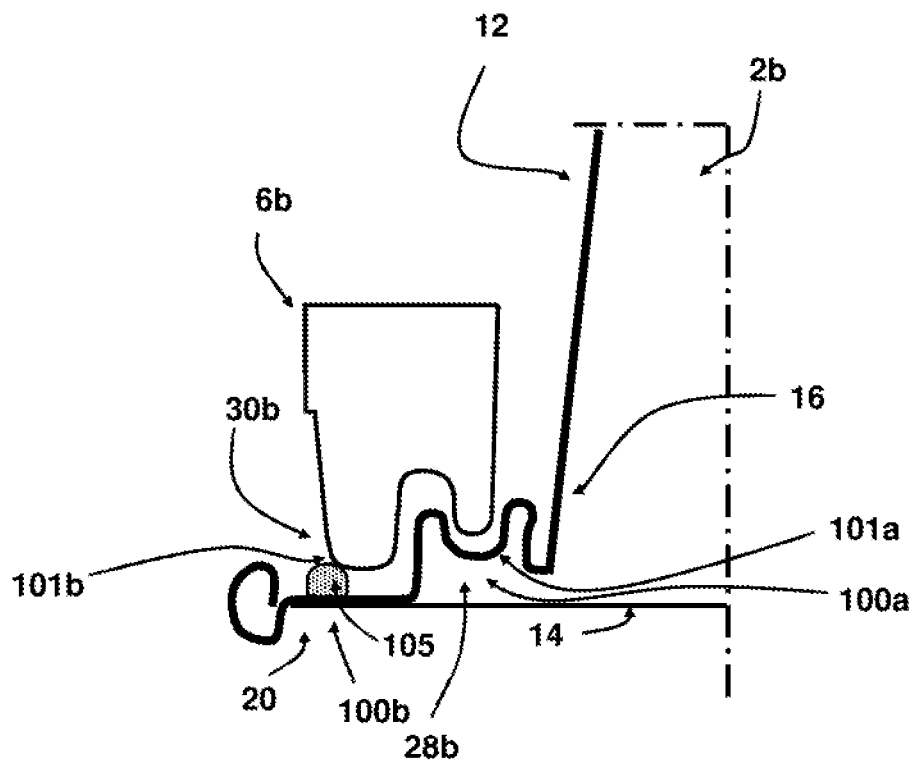

FIGS. 6a and 6b each show in cross section a schematic diagram of a system. The system includes an alternative second capsule 2b with an aluminum capsule body having a central capsule body axis, the aluminum capsule body being provided with a bottom, a side wall 16 and an outwardly extending flange 20, and further comprising an aluminum cover 14 attached to the outwardly extending flange 20, the cover hermetically closing the alternative second capsule 2b.

The system further includes a second beverage preparation device including a second enclosing member 6b for receiving either the first capsule 2a or the alternative second capsule 2b, wherein the second enclosing member 6b comprises second fluid injection means for supplying fluid under pressure into the capsule received in the second enclosing member 6b, wherein the second beverage preparation device comprises a second closing member for closing the second enclosing member 6b, wherein the second enclosing member 6b includes a second annular element having a central second annular element axis and a second free contact end 30b, said second free contact end 30b of the second annular element optionally being provided with a plurality of second radially extending open grooves.

It will be understood that there is no sealing interface between the first capsule 2a (not shown) and the second enclosing member 6b for providing a fluid sealing contact if the first capsule 2a is positioned in the second enclosing member
6b and the second enclosing member 6b is closed by means of the second closing member of the second beverage preparation device. There is a sealing interface between the alternative second capsule 2b and the second enclosing member 6b for providing a fluid sealing contact if the alternative second capsule 2b is positioned in the second enclosing member 6b and the second enclosing member 6b is closed by means of the second closing member.

In this example, the alternative second capsule 2b includes at least two sealing portions 100a, 100b, wherein a first sealing portion 100a is arranged for providing a first sealing interface 101a if the alternative second capsule 2b is positioned in the first enclosing member 6a of the first beverage preparation device and the first enclosing member 6a is closed by means of the first closing member, and wherein a second sealing portion 100b is arranged for providing a second sealing interface 101b if the alternative second capsule 2b is positioned in the second enclosing member 6b and the second enclosing member 6b is closed by means of the second closing member, the first sealing interface being different from the second sealing interface.

The alternative second capsule 2b in this example further includes an alternative sealing member 105 for providing the second sealing interface between the alternative second capsule and the second enclosing member 6b of the second beverage preparation device if the alternative second capsule 2b is positioned in the second enclosing member 6b and the second enclosing member 6b is closed by means of the second closing member.

It will be appreciated that the alternative sealing member 105 may alternatively be formed as a pre-formed shape in the outwardly extending flange 20, or elsewhere on the capsule body 12 of the capsule 2a. In an example, the alternative sealing member 105 may be unitary with respect to the aluminum capsule body 12 of the alternative second capsule 2b (e.g. outwardly extending flange, sidewall, etc.).

Figure 7A:
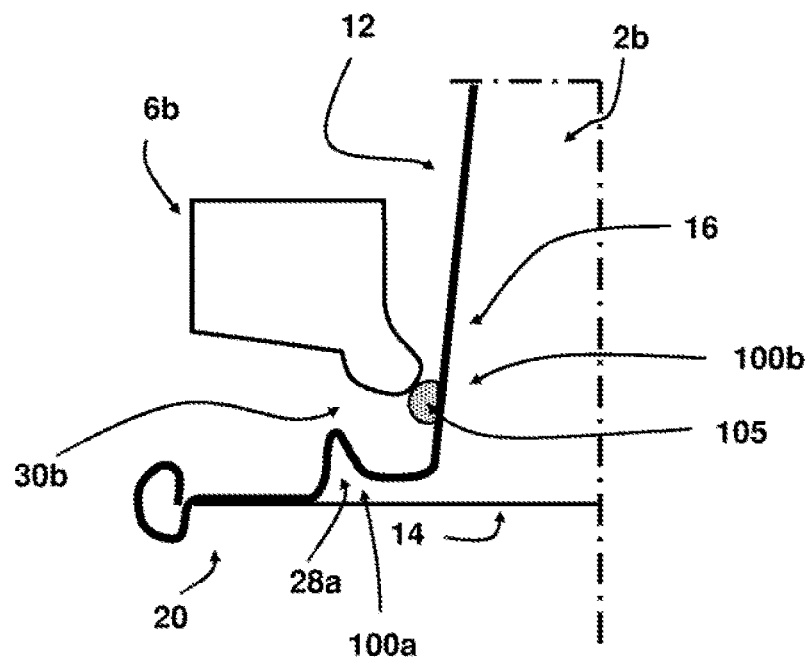
FIGS. 7a and 7b show in cross section a schematic diagram of a system.
Figure 7B:
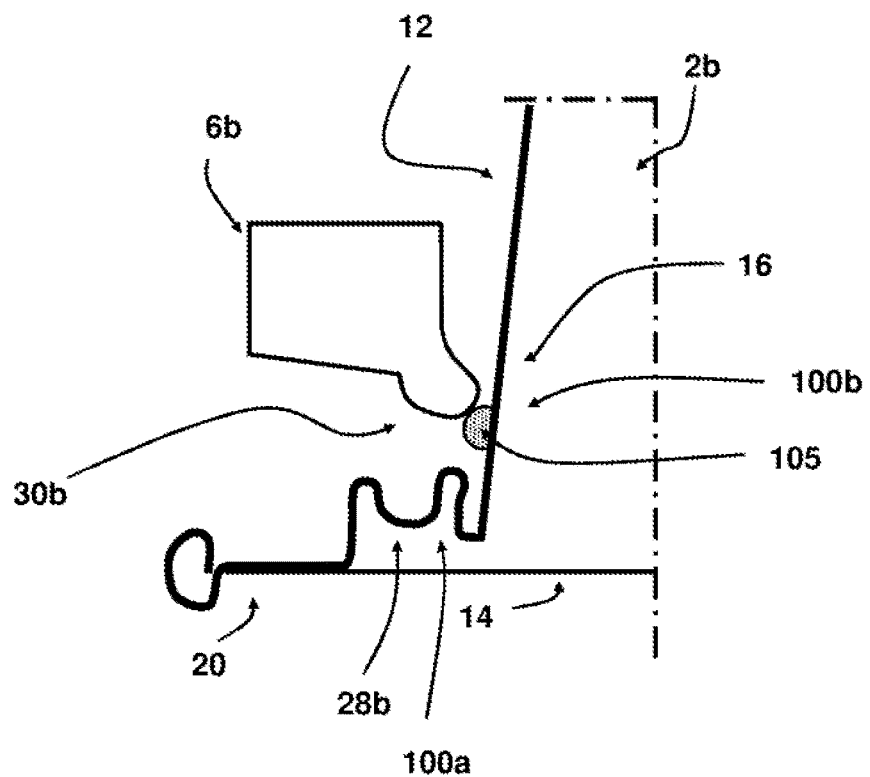

FIGS. 7a and 7b each show in cross section a schematic diagram of a system. In this example, the alternative sealing member 105 is arranged at the side wall 16 of the alternative second capsule 2b. The free end 30b of the second enclosing member 6b can interact with the alternative sealing member 105 for providing a fluid tight sealing contact. It will be understood that there is no sealing interface between the first capsule 2a and the second enclosing member 6b, and there is a sealing interface between the alternative second capsule 2b and the second enclosing member 6b.

It will be appreciated that in an alternative example, the alternative sealing member 105 may be formed as a preformed shape in the outwardly extending flange 20. The alternative sealing member 105 may for instance be unitary with respect to the aluminum capsule body 12 of the alternative second capsule 2b (see e.g. FIGS. 8a and 8b).

Figure 8A:
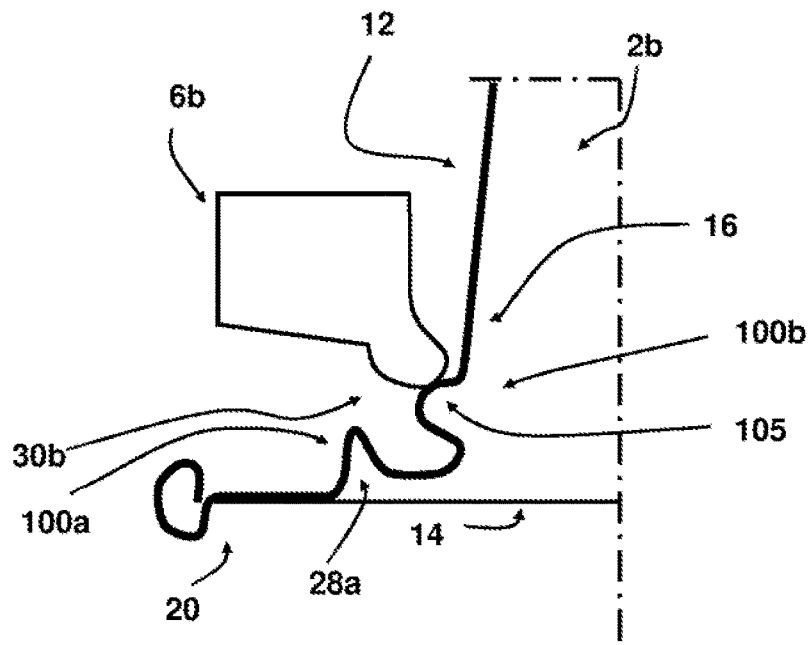
FIGS. 8a and 8b show in cross section a schematic diagram of a system.
Figure 8B:
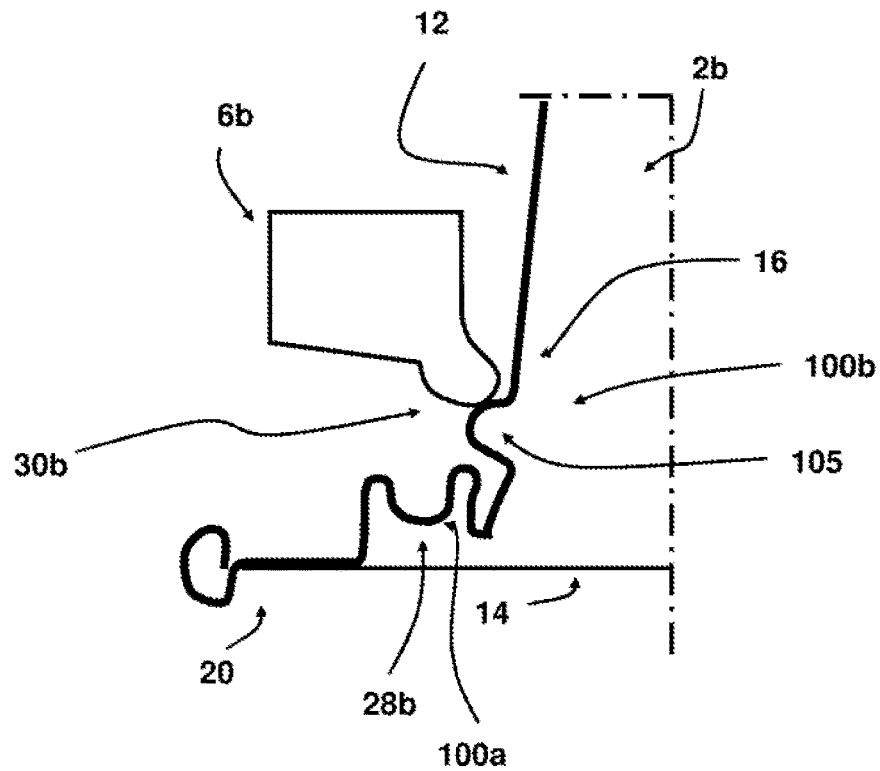

FIGS. 8a and 8b each show in cross section a schematic diagram of a system, wherein the alternative sealing member 105 of the alternative second capsule 2b is formed by a projection in the side wall 16. As in the examples shown in FIGS. 7a and 7b, the free end of the second enclosing member 6b can be pushed against the alternative sealing member 105 for providing a fluid tight sealing contact. It will be understood that there is no sealing interface between the first capsule 2a and the second enclosing member 6b, and there is a sealing interface between the alternative second capsule 2b and the second enclosing member 6b.

Figure 9A:
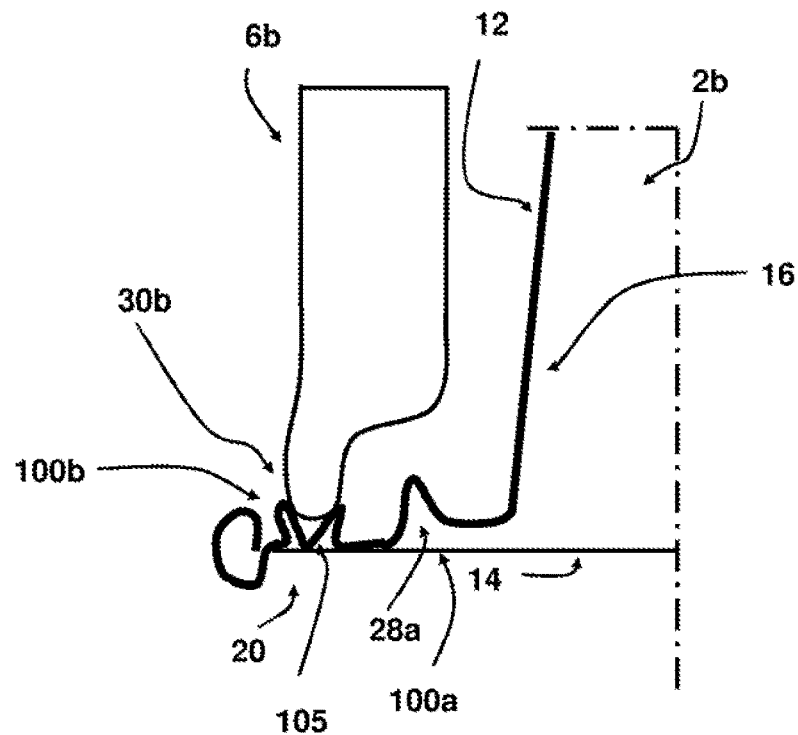
FIGS. 9a and 9b show in cross section a schematic diagram of a system.
Figure 9B:
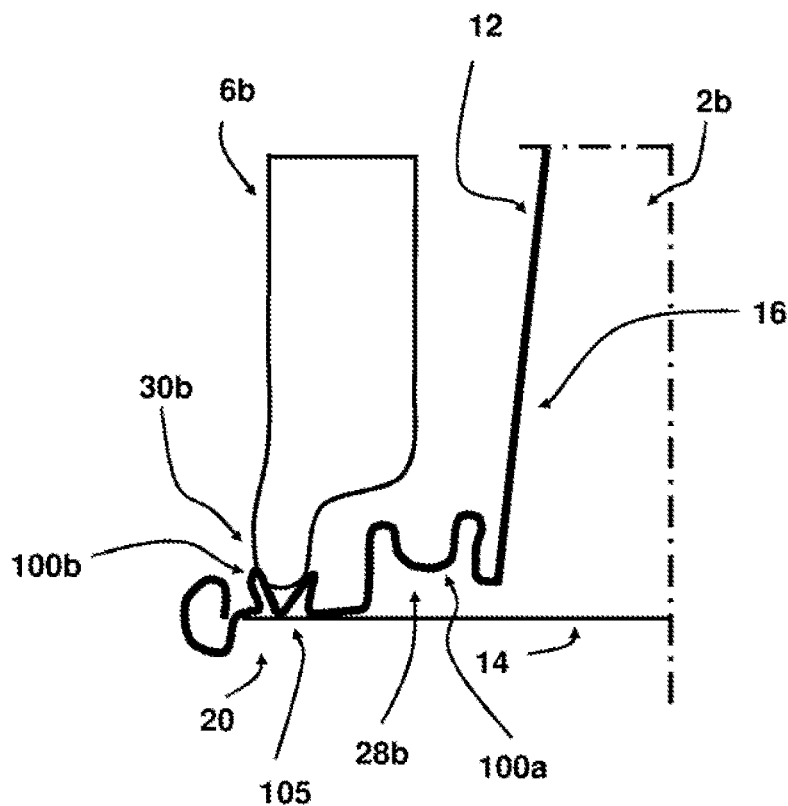

FIGS. 9a and 9b each show in cross section a schematic diagram of a system, wherein the alternative sealing member 105 is arranged on the outwardly extending flange 20 of the alternative second capsule 2b. The alternative sealing member 105 is arranged at a radially outside part of the outwardly extending flange 20 relative to the sealing member 28a, 28b. The alternative sealing member has two projections, wherein the second free end 30b of the second enclosing member 6b can be received between the two projections such as to form a fluid tight sealing if the alternative second capsule 2b is positioned in the second enclosing member 6b and the second enclosing member 6b is closed by means of the second closing member. It will be appreciated that a different number of projections can be employed for obtaining the sealing interface resulting in the fluid tight sealing during brewing. It will be understood that there is no sealing interface between the first capsule 2a and the second enclosing member 6b, and there is a sealing interface between the alternative second capsule 2b and the second enclosing member 6b.

Figure 10A:
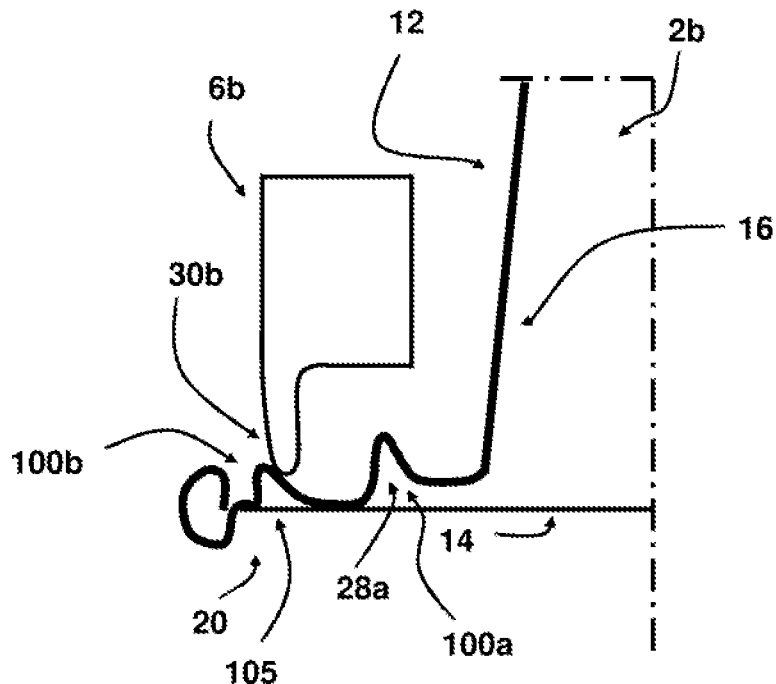
FIGS. 10a and 10b show in cross section a schematic diagram of a system.
Figure 10B:
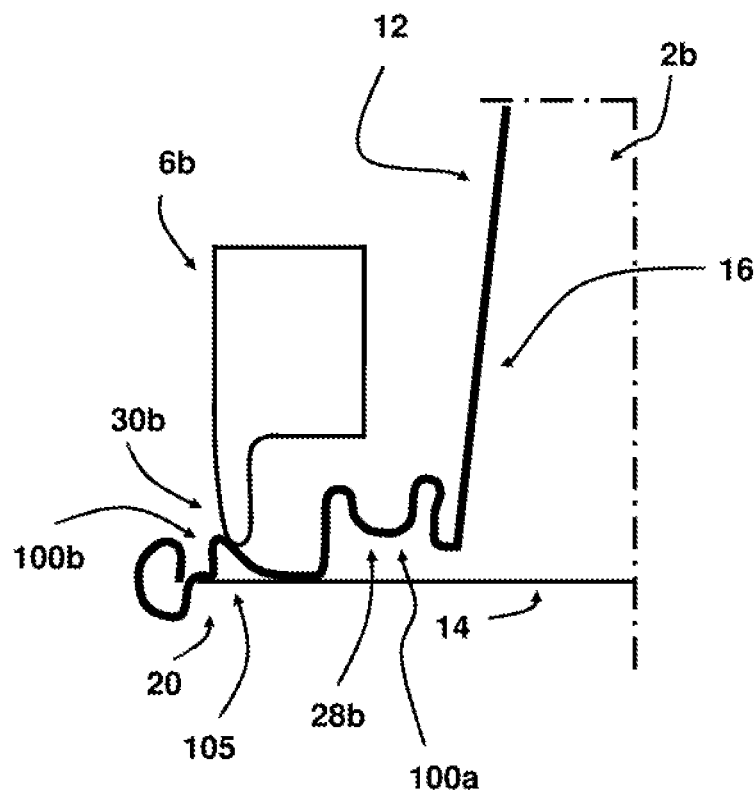

FIGS. 10a and 10b each show in cross section a schematic diagram of a system. Similar to the example shown in FIGS. 9a and 9b, the alternative sealing member 105 is arranged on the outwardly extending flange 20 of the alternative second capsule 2b, at a radially outside part thereof. The alternative sealing member 105 includes one projection arranged for interaction with the second free end 30b of the second enclosing member 6b such as to form the fluid tight sealing during brewing. It will be understood that there is no sealing interface between the first capsule 2a and the second enclosing member 6b, and there is a sealing interface between the alternative second capsule 2b and the second enclosing member 6b.

Figure 11A:
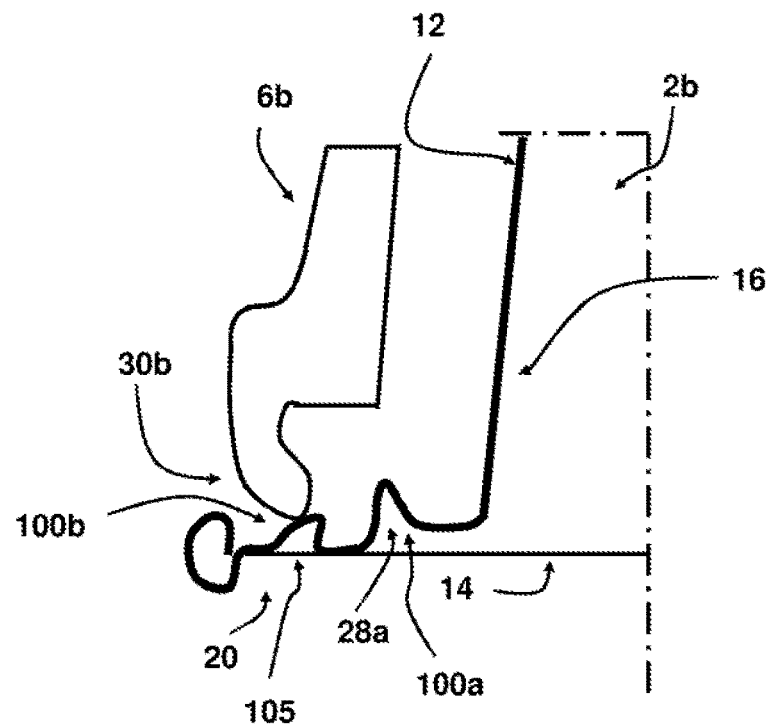
FIGS. 11a and 11b show in cross section a schematic diagram of a system.
Figure 11B:
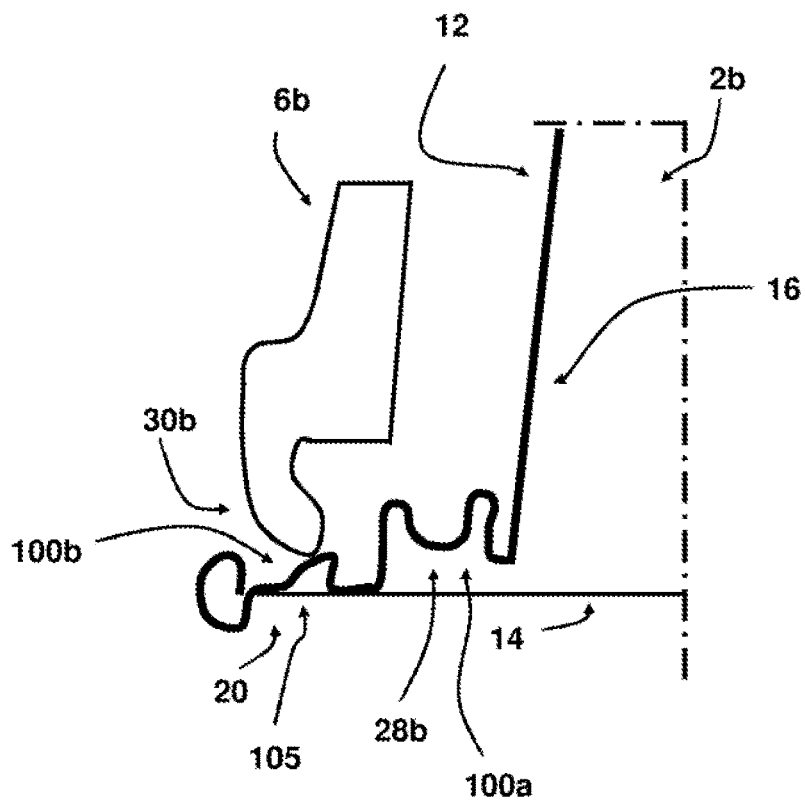

FIGS. 11a and 11b each show in cross section a schematic diagram of a system. In this example, the second alternative sealing member 105 arranged on the outwardly extending flange 20 of the alternative second capsule 2b is formed by a protrusion adapted to provide an improved sealing interface with the second free end 30b of the second enclosing member 6b. It will be understood that there is no sealing interface between the first capsule 2a and the second enclosing member 6b, and there is a sealing interface between the alternative second capsule 2b and the second enclosing member 6b.

Figure 12A:
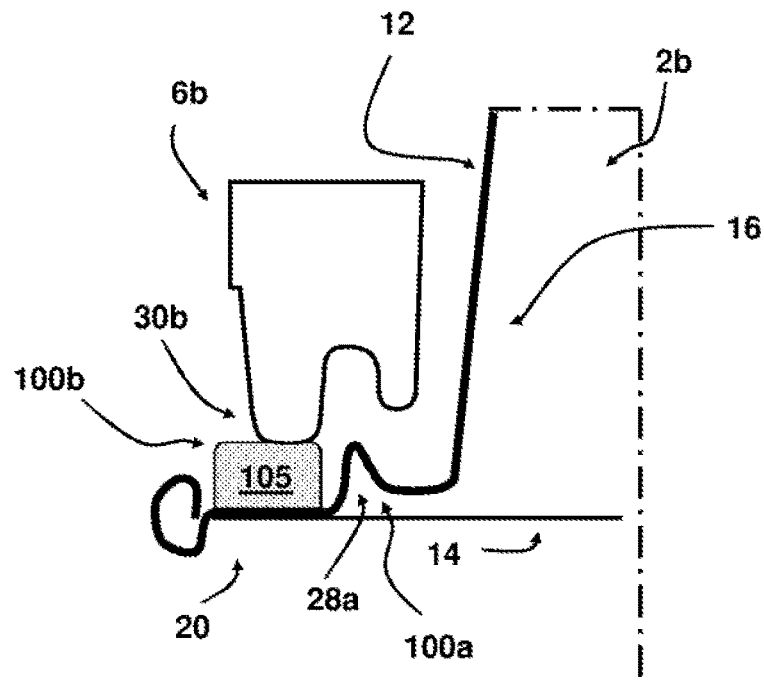
FIGS. 12a and 12b show in cross section a schematic diagram of a system.
Figure 12B:
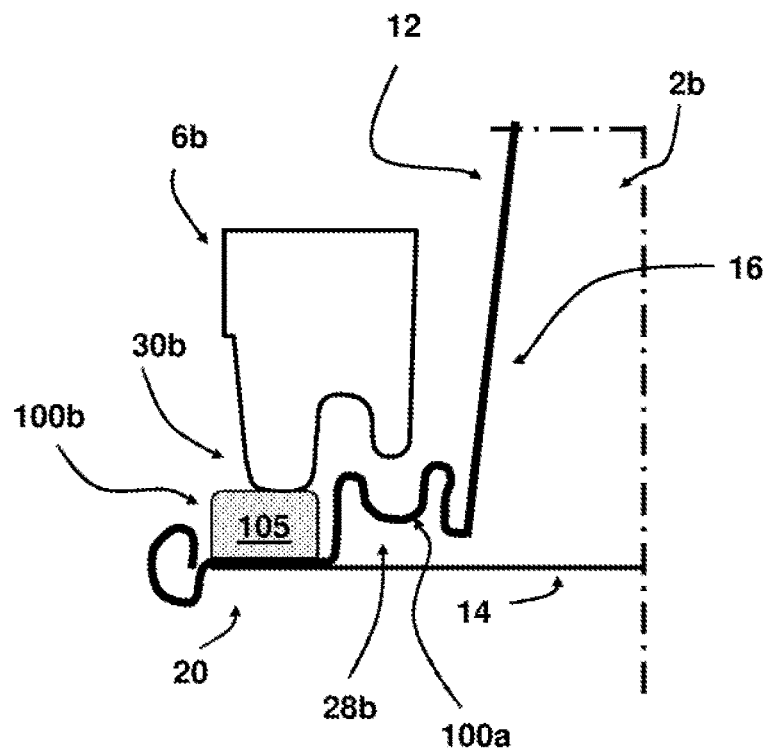
Figure 13A:
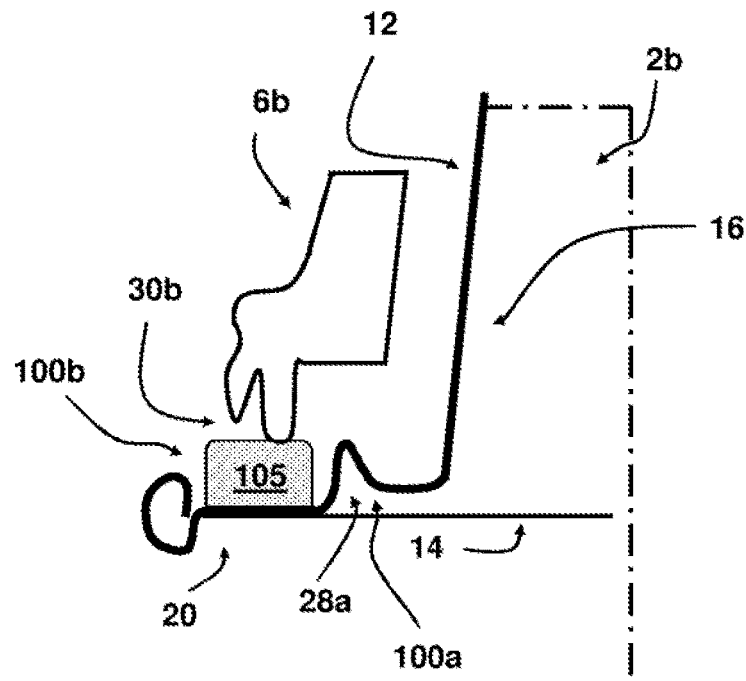
FIGS. 13a and 13b show in cross section a schematic diagram of a system.
Figure 13B:
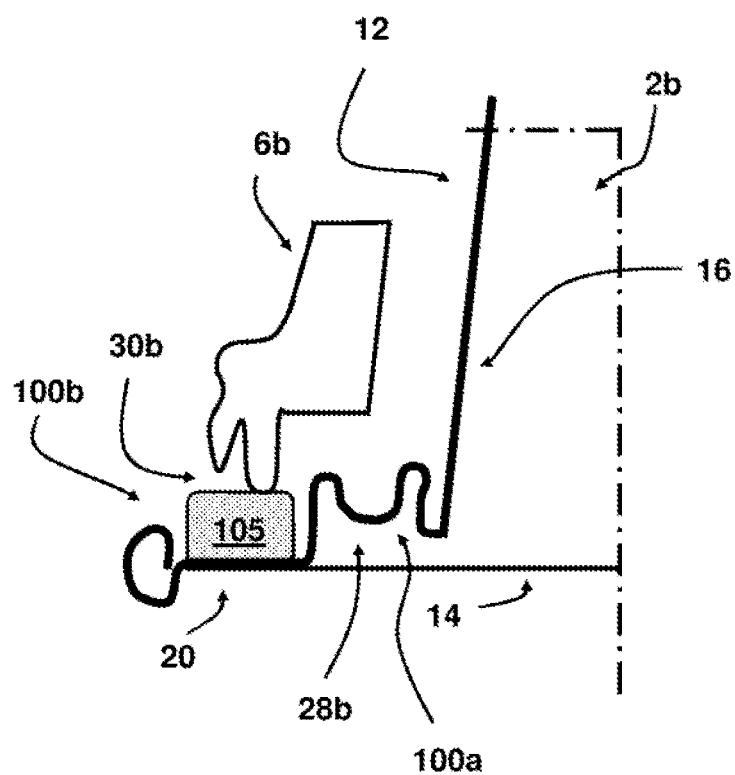

FIGS. 12a and 12b each show in cross section a schematic diagram of a system. On the outwardly extending flange 20 of the alternative second capsule 2b, an elastic alternative sealing member 105 is arranged. The elastic alternative sealing member 105 largely covers the space between the sealing member 28a, 28b and the outer end of the outwardly extending flange 20. In this way, the alternative second capsule can be compatible with a wide variety of second beverage preparation devices having an enclosing member 6b arranged for sealing by means of the second free end 30b at a particular location between the sealing member 28a, 28b and the outer end of the outwardly extending flange 20. In an example, the alternative sealing member 105 acts as a cushion, compatible with a plurality of different second free ends 30b having different properties, shapes and/or dimensions. For example, in the system depicted in FIGS. 13a and 13b a second enclosing member 6b having a different second free end 30b than shown in the example of FIGS. 12a and 12b. The alternative sealing member 105 also provides a fluid tight sealing contact when the second enclosing member 6b exerts a force thereon.

Figure 14A:
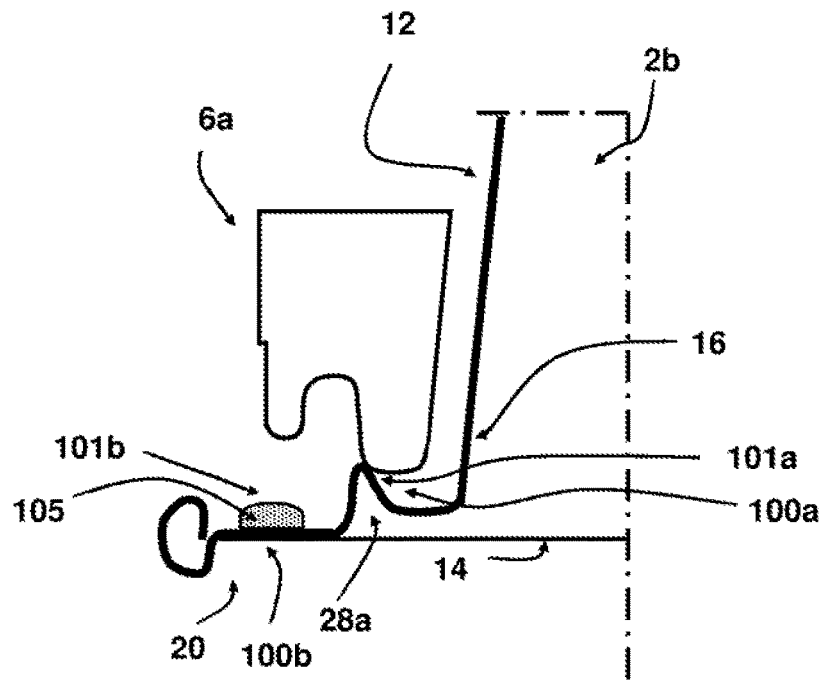
FIGS. 14a and 14b show in cross section a schematic diagram of a system.
Figure 14B:
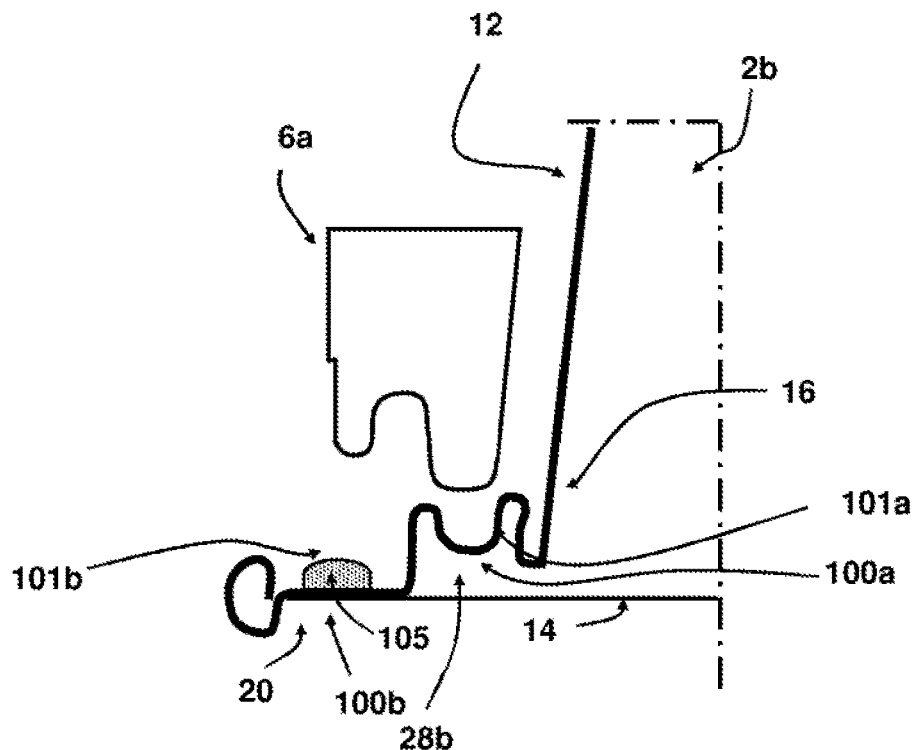

FIGS. 14a and 14b show in cross section a schematic diagram of a system with an alternative second capsule 2b and a first enclosing member 6a of a first beverage preparation device. There is a sealing interface between the alternative second capsule 2b and the first enclosing member 6a for providing a fluid sealing contact if the alternative second capsule 2b is positioned in the first enclosing member 6a and the first enclosing member 6a is closed by means of the first closing member. In this example, the alternative second capsule 2b comprises an alternative sealing member 105. By means of the alternative sealing member 105, a sealing interface may be obtained when the alternative second capsule 2b is positioned in the second enclosing member 6b (see FIG. 6a and 6b) of the second beverage preparation device, and the second enclosing member 6b is closed by means of the second closing member.

It will be appreciated that the alternative sealing member 105 may be formed as a pre-formed shape in the outwardly extending flange 20 in the examples of FIGS. 12-14. The alternative sealing member 105 may for instance be unitary with respect to the aluminum capsule body 12 of the alternative second capsule 2b.

Figure 15A:
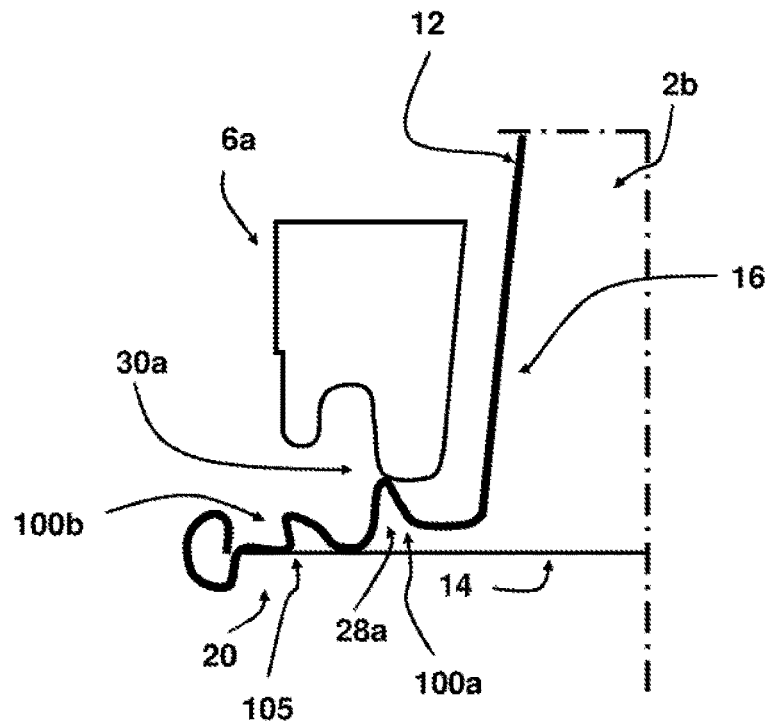
FIGS. 15a and 15b show in cross section a schematic diagram of a system.
Figure 15B:
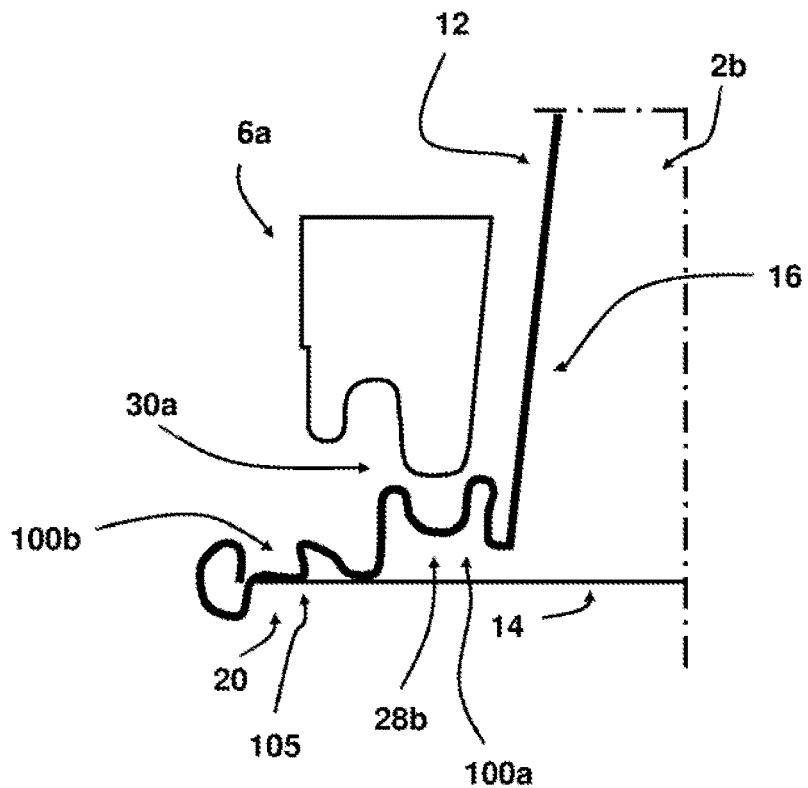
Figure 16A:
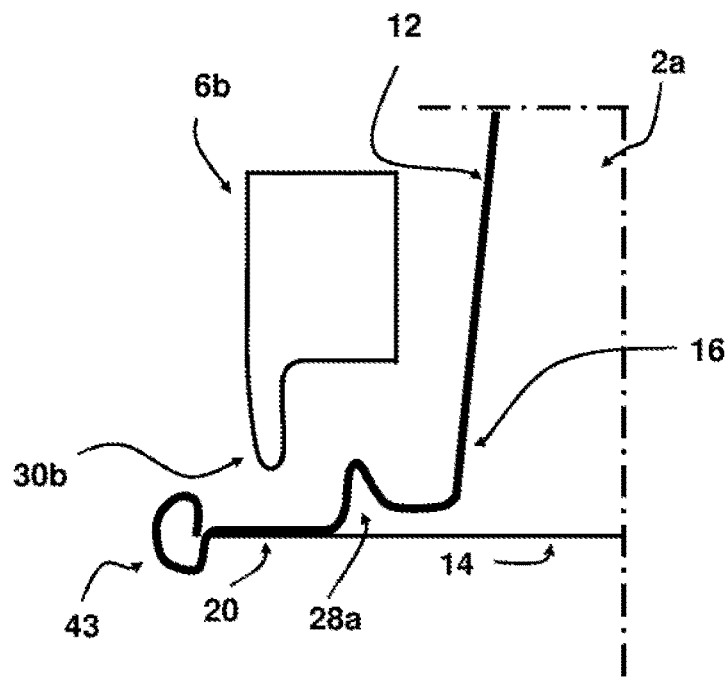
FIGS. 16a and 16b show in cross section a schematic diagram of a system.
Figure 16B:
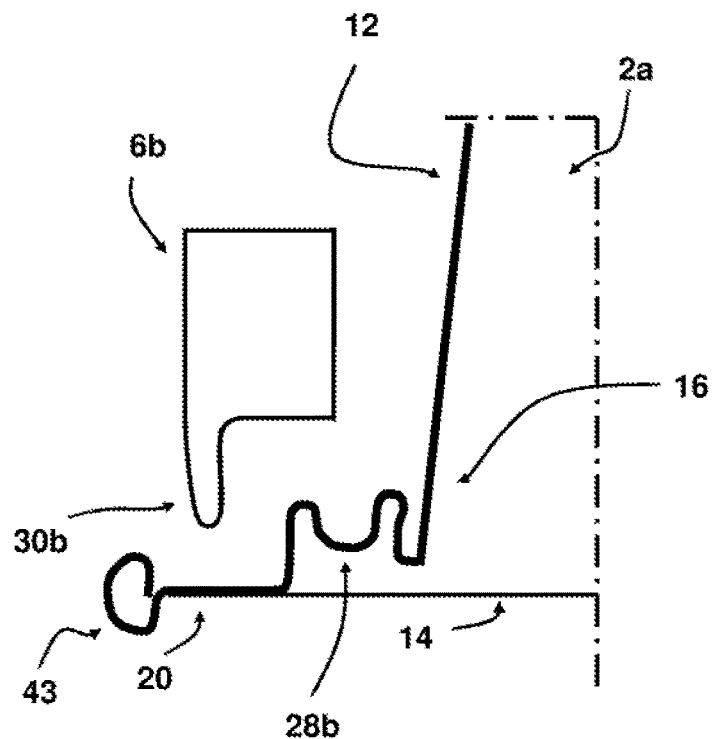

FIGS. 15a and 15b show, a cross section of a system with an alternative second capsule 2b and a first enclosing member 6a of a first beverage preparation device, similar to the example shown in FIGS. 14a and 14b. The alternative sealing member 105 is located radially outwardly with respect to sealing member 28a, 28b of the alternative second capsule 2b. The alternative sealing member 105 is formed by a protrusion integral with the outwardly extending flange 20. It will be appreciated that other types of alternative sealing members may be employed. FIG. 16a and 16b show in cross section a schematic diagram of a system with a first capsule 2a and a second enclosing member 6b of a second beverage preparation device. There exists no sealing interface between the first capsule 2a and the second enclosing member 6b of the second beverage preparation device for providing a fluid sealing contact if the first capsule 2a is positioned in the second enclosing member 6b and the second enclosing member 6b is closed by means of the second closing member.

Figure 17:
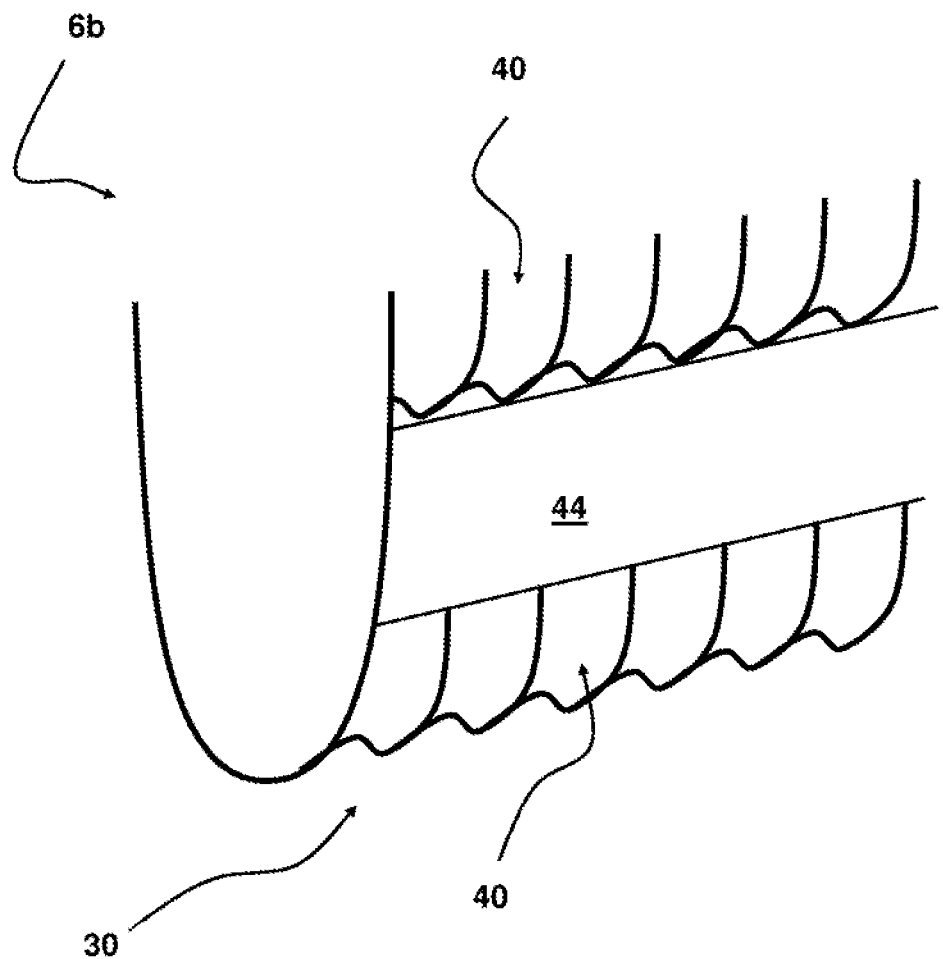
FIG. 17 shows in perspective cross section a schematic diagram of a second enclosing member.

FIG. 17 shows in perspective cross section a schematic diagram of a second enclosing member 6b of a second beverage preparation device. The second enclosing member 6b includes a plurality of radially extending open grooves 40. In this example, the second enclosing member 6b includes at least one smoothed portion 44 free of said open grooves 40. The sealing interface between the second enclosing member 6b and the alternative second capsule 2b may be obtained by means of the smoothed portion 44 of the second enclosing member 6b, for providing a fluid sealing contact if the alternative second capsule 2b is positioned in the second enclosing member 6b and the second enclosing member is closed by means of the second closing member. It will be appreciated that the smoothed portion 44 may be located at different locations of the second enclosing member 6b. It is also envisaged that a plurality of smoothed portions 44 are arranged on the second enclosing member 6b. Additionally or alternatively, the smoothed portion 44 may have other shapes, such as a curved shape (e.g. convex, concave) for enabling an improved sealing interaction with the alternative second capsule 2b. The smoothed portion 44 can be arranged at a radially inner side of the second enclosing member 6b (inner wall directed towards the capsule).

Figure 18:
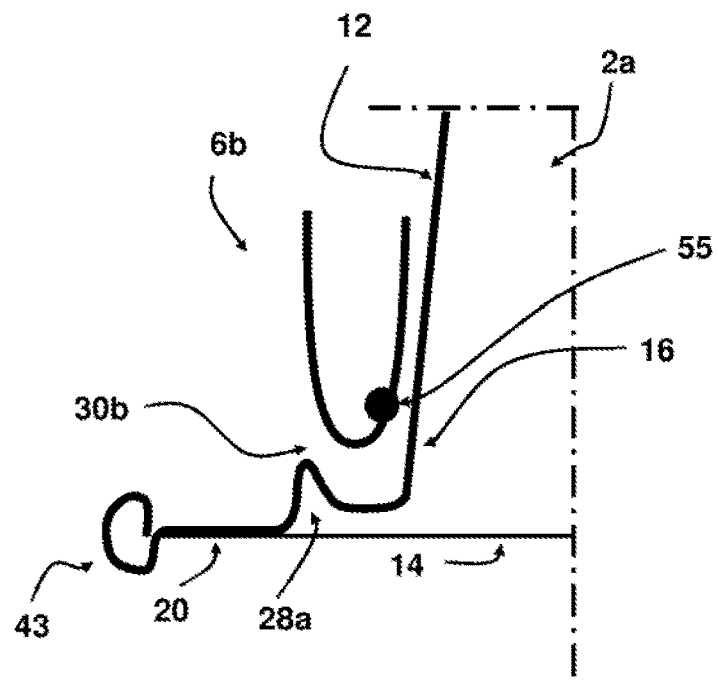
FIG. 18 shows in cross section a schematic diagram of a system.

FIG. 18 shows in cross section a schematic diagram of a system with a first capsule 2a and a second enclosing member 6b of a second beverage preparation device. The first capsule 2a includes a sealing member 28a at the outwardly extending flange 20 for providing a fluid sealing contact with the first enclosing member 6a (cf. FIG. 5a) of the first beverage preparation device if the capsule 2a is positioned in the first enclosing member 6a of the first beverage preparation device and the first enclosing member 6a is closed by means of the first closing member of the first beverage preparation device, such that the outwardly extending flange 20 of the capsule 2a and at least a portion of the sealing member 28a of the capsule 2a are sealingly engaged between the first enclosing member 6a and the first closing member. The sealing member 28a of the capsule 2a is integral with the outwardly extending flange 20 and comprises one projection projecting from the outwardly extending flange. It will be appreciated that the a different number of protrusions may be arranged (e.g. 2, 3, etc.), for example being arranged to sealingly engage with the free end of the first beverage preparation device.

The first capsule 2a is inserted in the second beverage preparation device as depicted in FIG. 18. The second beverage preparation device includes a second enclosing member 6b comprising a sealing element 55 for providing a second sealing interface between the first capsule 2a and the second enclosing member 6b of the second beverage preparation device if the first capsule 2a is positioned in the second enclosing member 6b and the second enclosing member 6b is closed by means of the second closing member. The sealing element 55 can be pushed against the side wall 16, such that the second sealing interface is obtained.

In an example, an adequate sealing may not be obtained if the sealing element 55 were omitted in the system. The free end of the second enclosing member 6b may fail to sufficiently sealingly engage with the sealing member 28a of the capsule 2a.

The sealing element 55 may be configured at a radially inner side of the second enclosing member 6b configured for sealing against the sidewall 12 of the first capsule 2a if the second enclosing member 6b is closed by means of the second closing member. The sealing element 55 may have different dimensions and shapes. In an example, the sealing element is an O-ring, for instance made out of an elastic material (e.g. rubber seal).

Figure 19:
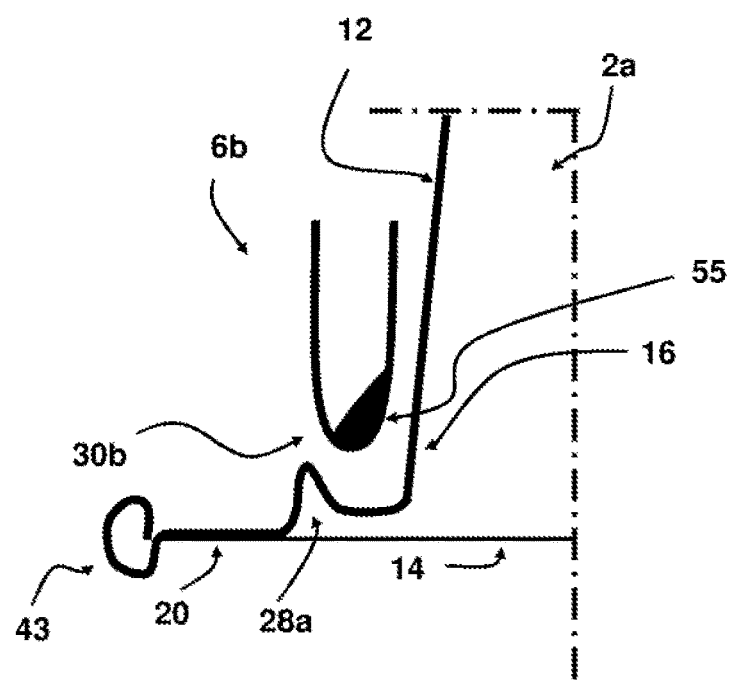
FIG. 19 shows in cross section a schematic diagram of a system.

FIG. 19 shows in cross section a schematic diagram of a system with a first capsule 2a and a second enclosing member 6b of a second beverage preparation device. The second enclosing member 6b has a sealing element 55. The sealing element 55 may be elastic (e.g. rubber material), providing a sealing contact at the outwardly extending flange and/or the sidewall of the first capsule 2a if the second enclosing member 6b is closed by means of the second closing member.

Figure 20:
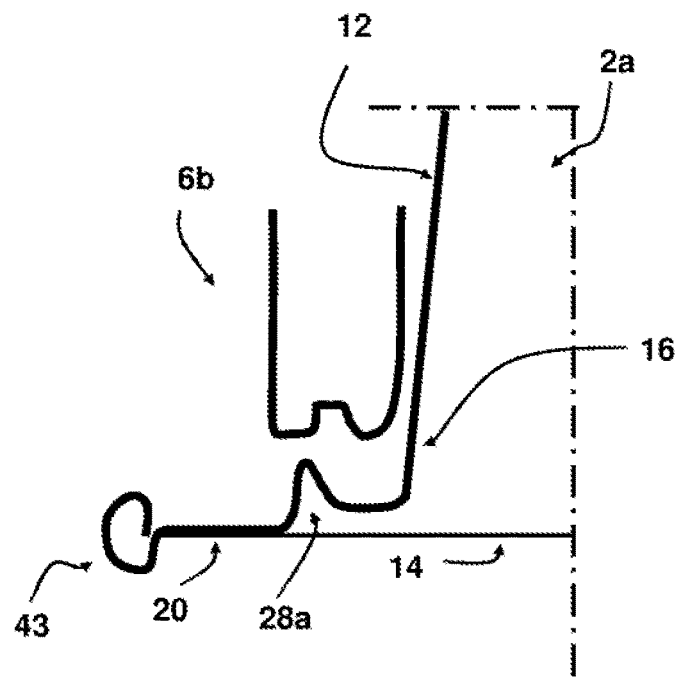
FIG. 20 shows in cross section a schematic diagram of a system.

FIG. 20 shows in cross section a schematic diagram of a system with a first capsule 2a and a second enclosing member 6b of a second beverage preparation device. The second enclosing member 6b has a radially outward portion arranged for crushing the sealing member 28a and a radially inward portion arranged for providing a sealing contact against a sidewall of the first capsule 2a. In this example, the radially outward crushing portion is substantially flat, such as to allow an improved pushing action against the at least one protrusion of the sealing member 28a.

Figure 21:
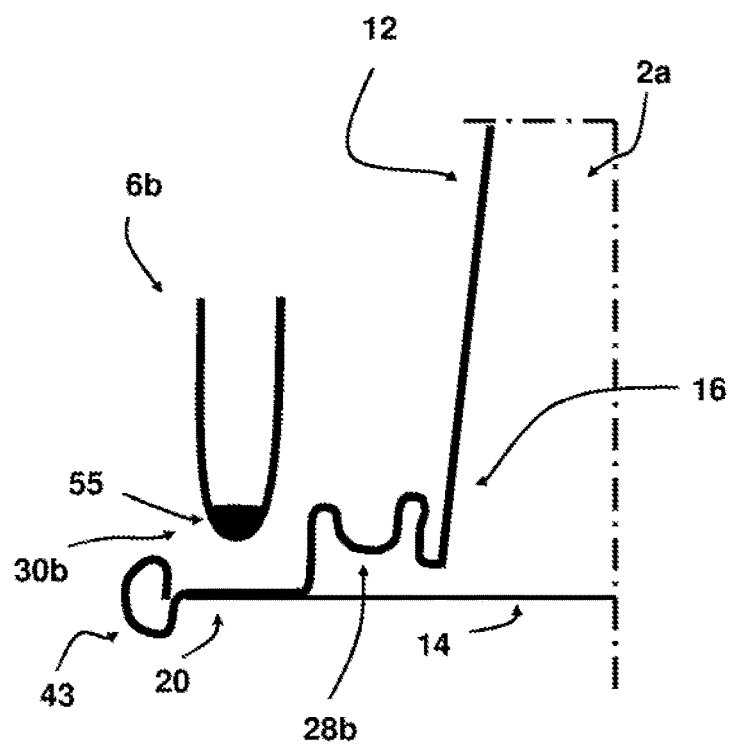
FIG. 21 shows in cross section a schematic diagram of a system.

FIG. 21 shows in cross section a schematic diagram of a system with a first capsule 2a and a second enclosing member 6b of a second beverage preparation device. The second free end 30b of the second beverage preparation device is made out of an elastic material (e.g. rubber), forming a sealing element 55. The sealing element 55 is arranged to provide sealing if the second enclosing member 6b is closed by means of the second closing member. The sealing element 55 is integrated with the second enclosing member 6b.

Figure 22A:
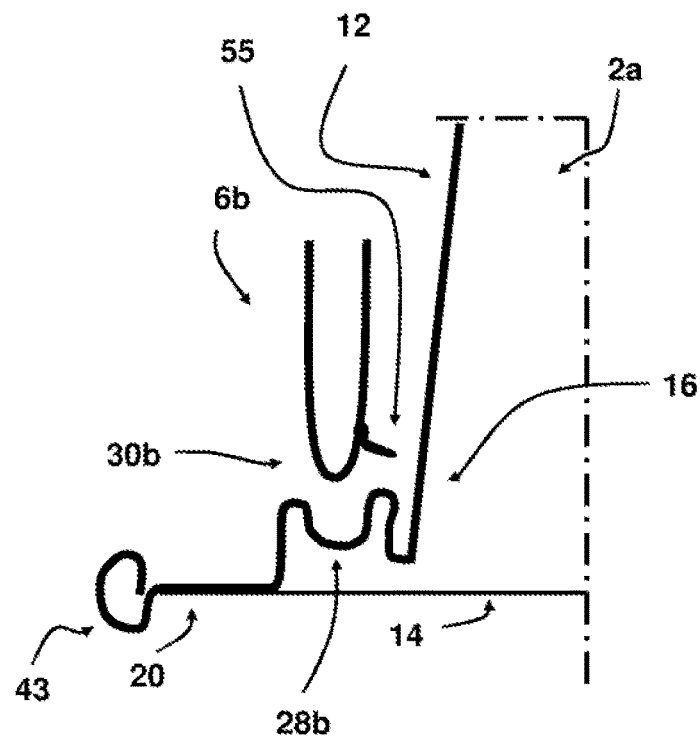
FIGS. 22a and 22b show in cross section a schematic diagram of a system.
Figure 22B:
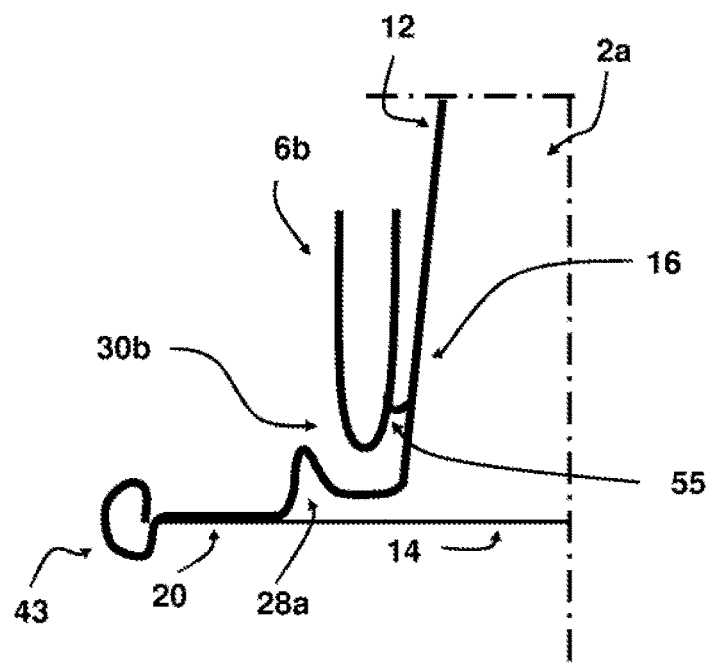

FIGS. 22a and 22b show in cross section a schematic diagram of a system with a first capsule 2a and a second enclosing member 6b of a second beverage preparation device. In FIG. 22a, the second enclosing member 6b includes a sealing element 55 in the shape of a tab extending radially inward, towards the first capsule 2a. The tab may be elastic. The tab is arranged for providing sealing if the second enclosing member 6b is closed by means of the second closing member. The tab-shaped element can seal against the sealing member 28b. It will be appreciated that the tab-shaped sealing element 55 may have various lengths. For instance, the tab-shaped sealing element 55 may have a longer length such as to seal against the sidewall 12 if the second enclosing member 6b is closed. In FIG. 22b, similar to the system shown in FIG. 22a, the second enclosing member 6b includes a sealing element 55 in the shape of a tab extending radially inward, towards the first capsule 2a. The tab is arranged for providing sealing contact with the sidewall of the first capsule 2a, if the second enclosing member 6b is closed by means of the second closing member.

Figure 23A:
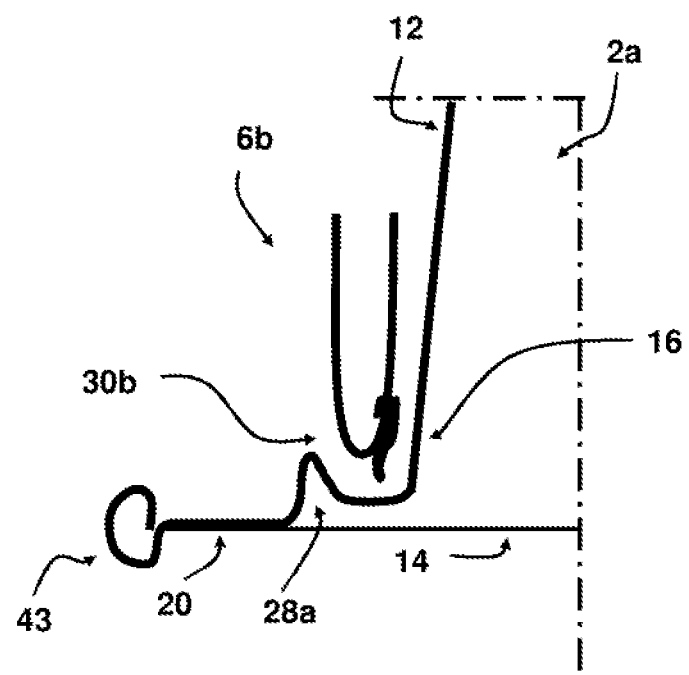
FIGS. 23a and 23b show in cross section a schematic diagram of a system.
Figure 23B:
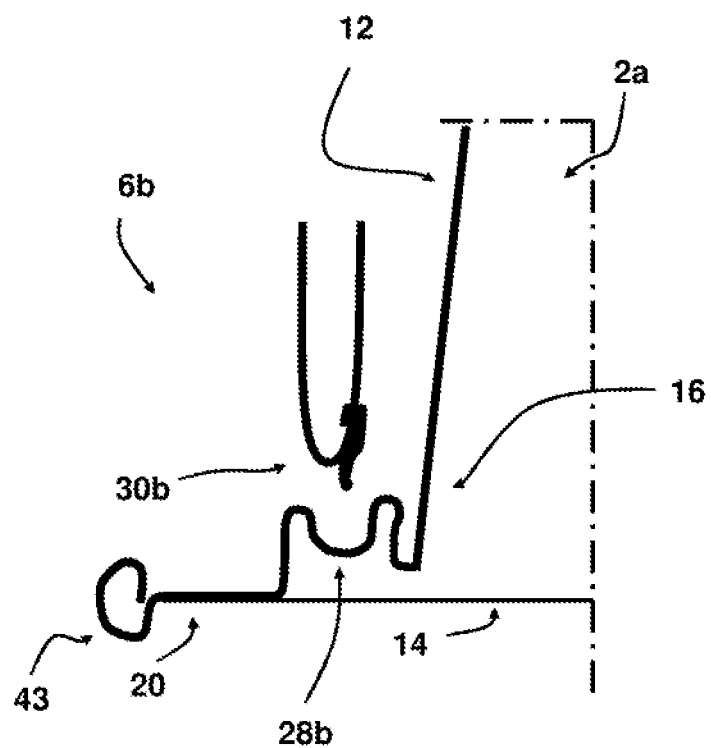

FIGS. 23a and 23b shows in cross section a schematic diagram of a system including a first capsule 2a and a second enclosing member 6b of a second beverage preparation device. In FIG. 23a, the first capsule 2a includes a sealing member 28a with one protrusion, and in FIG. 23b, the first capsule 2a includes a sealing member 28b with two protrusions. The second enclosing member 6b includes a sealing element 55 shaped as a tongue. The tongue-shaped sealing element 55 extends substantially towards the outwardly extending flange 20 of the first capsule 2a. Sealing can be obtained by means of the tongue if the second enclosing member 6b is closed using the second closing member.

It will be appreciated that a wide variety of first capsules, second capsules, first beverage preparation devices, and second beverage preparation devices can be employed.

It will be appreciated that the existence of a fluid sealing contact can mean that 0-6%, preferably 0-4%, more preferably 0-2.5% of the total fluid supplied to the enclosing member for preparing the beverage may leak away due to leakage between the free contact end and the sealing member of the capsule.

In some examples, the sealing element and/or alternative sealing member is depicted as an additional element attached or connected to the capsule body. It will be appreciated that the sealing element and/or alternative sealing member may also be pre-formed in the capsule body. For instance, the sealing element and/or alternative sealing member may be integral with the aluminum capsule body (e.g. outwardly extending flange, side wall, etc.).

It will be appreciated that the second capsule may include one or more further sealing interfaces when used in one or more further beverage preparation devices, while maintaining compatibility with the first beverage preparation device and the second beverage preparation device.

It will be appreciated that the beverage preparation device may include a plurality of enclosing members arranged for receiving a plurality of capsules simultaneously.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. System for preparing a potable beverage, the system comprising:
   a first capsule and an alternative second capsule, each containing a substance for the preparation of a potable beverage by extracting and/or dissolving the substance by means of a fluid supplied under pressure into the capsule, wherein the first capsule and the alternative second capsule each comprise an aluminum capsule body having a central capsule body axis, the aluminum capsule body being provided with a bottom, a side wall and an outwardly extending flange, and further comprise an aluminum cover attached to the outwardly extending flange, the cover hermetically closing the capsule,
   a first beverage preparation device including a first enclosing member for receiving either the first capsule or the alternative second capsule, wherein the first enclosing member comprises first fluid injection means for supplying fluid under pressure into the capsule received in the first enclosing member, wherein the first beverage preparation device comprises a first closing member for closing the first enclosing member, wherein the first enclosing member includes a first annular element having a first central annular element axis and a first free contact end, said first free contact end of the first annular element optionally being provided with a plurality of radially extending first open grooves,
   a second beverage preparation device including a second enclosing member for receiving either the first capsule or the alternative second capsule, wherein the second enclosing member comprises second fluid injection means for supplying fluid under pressure into the capsule received in the second enclosing member, wherein the second beverage preparation device comprises a second closing member for closing the second enclosing member, wherein the second enclosing member includes a second annular element having a central second annular element axis and a second free contact end, said second free contact end of the second annular element optionally being provided with a plurality of second radially extending open grooves,
   wherein the first capsule and the alternative second capsule each include a sealing member at the outwardly extending flange for providing a fluid sealing contact with the first enclosing member if the capsule is positioned in the first enclosing member and the first enclosing member is closed by means of the first closing member, such that the outwardly extending flange of the first capsule or alternative second capsule and at least a portion of the sealing member of the first capsule or alternative second capsule are sealingly engaged between the first enclosing member and the first closing member,
   wherein the sealing member of the first capsule and the alternative second capsule is integral with the outwardly extending flange and comprises at least one projection projecting from the outwardly extending flange, said at least one projection comprising a projection top, and wherein the at least one projection is configured such that its projection top exerts a radial force on the first free contact end of the first annular element if the capsule is positioned in the first enclosing member and the first enclosing member is closed by means of the first closing member of the first beverage preparation device,
   wherein there is no sealing interface between the first capsule and the second enclosing member for providing a fluid sealing contact if the first capsule is positioned in the second enclosing member and the second enclosing member is closed by means of the second closing member,
   wherein there is a sealing interface between the alternative second capsule and the second enclosing member for providing a fluid sealing contact if the alternative second capsule is positioned in the second enclosing member and the second enclosing member is closed by means of the second closing member.

2. System according to claim 1, wherein the alternative second capsule includes at least two sealing portions, wherein a first sealing portion is arranged for providing a first sealing interface if the alternative second capsule is positioned in the first enclosing member of the first beverage preparation device and the first enclosing member is closed by means of the first closing member, wherein a second sealing portion is arranged for providing a second sealing interface if the alternative second capsule is positioned in the second enclosing member and the second enclosing member is closed by means of the second closing member, the first sealing interface being different from the second sealing interface.

3. System according to claim 1, wherein the first capsule has a same sealing interface as the alternative second capsule if the first capsule is positioned in the first enclosing member of the first beverage preparation device, wherein the sealing interface of the first capsule corresponds to the first sealing interface of the alternative second capsule.

4. System according to claim 1, wherein the alternative second capsule further includes an alternative sealing member for providing the second sealing interface between the alternative second capsule and the second enclosing member of the second beverage preparation device if the alternative second capsule is positioned in the second enclosing member and the second enclosing member is closed by means of the second closing member.

5. System according to claim 4, wherein the alternative sealing member is configured to be biased against and in contact with the second enclosing member.

6. System according to claim 4, wherein the alternative sealing member is elastically deformable.

7. System according to claim 4, wherein the alternative sealing member forms a self-reinforcing sealing configuration when pressure is applied.

8. System according to claim 1, wherein the second enclosing member includes a sealing element for providing the second sealing interface between the alternative second capsule and the second enclosing member of the second beverage preparation device if the alternative second capsule is positioned in the second enclosing member and the second enclosing member is closed by means of the second closing member.

9. System according to claim 8, wherein the sealing element is configured to seal against the flange, sidewall and/or the bottom of the alternative second capsule if the capsule is positioned in the second enclosing member and the second enclosing member is closed by means of the second closing member.

10. System according to claim 8, wherein the sealing element is positioned at the second annular element of the second enclosing member.

11. System according to claim 8, wherein the sealing element is configured to be biased against and in contact with the alternative second capsule.

12. System according to claim 8, wherein the sealing element is elastically deformable.

13. System according to claim 8, wherein the sealing element forms a self-reinforcing sealing configuration when pressure is applied.

14. System according to claim 1, wherein the sealing member comprises a further projection projecting from the outwardly extending flange and a plateau between said two projections, wherein a distance between the two projections is such that the first free contact end of the first annular element is enclosed between the two projections if either the first capsule or the alternative second capsule is positioned in the first enclosing member and the first enclosing member is closed by means of the first closing member.

15. System according to claim 14, wherein a first one of the two projections of the sealing member projects further from a base portion of the outwardly extending flange, to which base portion the cover is attached, than a second one of the two projections of the sealing member.

16. System according to claim 15, wherein the plateau has a bottom end which is radially closer to a projection top of said second one of said projections than to a projection top of said first one of said projections.

17. System according to claim 14, wherein a first one of the two projections has a first conical sloping side surface on a side facing a second one of the two projections and the second one of the two projections has a second conical sloping side surface on a side facing the first one of the two projections, said first side surface having a greater size from its top end to its lower end than said second side surface.

18. System according to claim 14, wherein a first one of the two projections has a first conical sloping side surface on a side facing a second one of the two projections and the second one of the two projections has a second sloping side surface on a side facing the first one of the two projections, said first side surface having a conical generatrix at a first enclosed angle relative to the cover, said second side surface having a conical generatrix at a second enclosed angle relative to the cover, said first angle being smaller than said second angle.

19. System according to claim 14, wherein the first one of the two projections is an outer one of the two projections.

20. System according to claim 14, wherein the plateau is axially spaced from the cover.

21. System according to claim 14, wherein the distance between the two projections is such that the first free contact end of the first annular element is contacted by the two projections if either the first capsule or the alternative second capsule is positioned in the first enclosing member and the first enclosing member is closed by means of the first closing member.

22. System according to claim 14, wherein the two spaced projections and the plateau are arranged such that the first free contact end of the first annular element is contacted by the plateau if either the first capsule or the alternative second capsule is positioned in the first enclosing member and the first enclosing member is closed by means of the first closing member.

23. System according to claim 14, wherein the first capsule and the alternative second capsule each comprises a bearing for the first enclosing member if the capsule is positioned in the first enclosing member and the first enclosing member is closed by means of the first closing member, said bearing enclosing at least a portion of the first free contact end of the first annular element and said bearing being formed by the two projections and the plateau there between.

24. System according to claim 1, wherein the at least one projection comprises a projection side wall which is inclined with regard to the outwardly extending flange of the aluminum capsule body, said projection side wall being configured such that it is deformed easily if the capsule is positioned in the enclosing member of the beverage preparation device and the enclosing member is closed by means of the closing member of the beverage preparation device.

25. System according to claim 1, wherein the distance between the projection and the side wall of the aluminum capsule body is such that the first free contact end of the first annular element is contacted by the projection and the side wall of the aluminum capsule body if either the first capsule or the alternative second capsule is positioned in the first enclosing member of the first beverage preparation device and the first enclosing member is closed by means of the first closing member of the first beverage preparation device.

26. System according to claim 1, wherein the sealing member in addition to the at least one projection projecting from the outwardly extending flange comprises a plateau between the projection top and the side wall of the aluminum capsule body.

27. System according to claim 26, wherein a bearing is formed by the projection, plateau and the side wall of the aluminum capsule body, wherein a distance between the projection and the side wall is such that the first free contact end of the first annular element is enclosed by the projection and the side wall of the aluminum capsule body if either the first capsule or the alternative second capsule is positioned in the first enclosing member of the first beverage preparation device and the first enclosing member is closed by means of the first closing member of the first beverage preparation device.

28. System according to claim 26, wherein the projection, the side wall of the aluminum capsule body and the plateau are arranged such that the first free contact end of the first annular element is contacted by the plateau if either the first capsule or the alternative second capsule is positioned in the first enclosing member of the first beverage preparation device and the first enclosing member is closed by means of the first closing member of the first beverage preparation device.

29. System according to claim 1, wherein the sealing member is deformable such that said sealing member fluid sealingly contacts at least a portion of the first free contact end of the first annular element if, in use, the maximum fluid pressure in the first enclosing member of the first beverage preparation device is in a range of 6-20 bar.

30. System according to claim 1, wherein the sealing member is deformable such that said sealing member fluid sealingly contacts at least a portion of the first free contact end of the first annular element if, during brewing, said first free contact end of the first annular element exerts a force F2 on the sealing member of either the first capsule or the alternative second capsule, wherein F2 is in a range of 500-1500 N when the fluid pressure P2 in said first enclosing member outside the capsule is in a range of 6-20 bar.

31. System according to claim 1, wherein the sealing member is deformable such that said sealing member fluid sealingly contacts at least a portion of the first free contact end of the first annular element if, in use, prior to or at the start of brewing, said first free contact end of the first annular element exerts a force F1 on the sealing member of either the first capsule or the alternative second capsule, wherein the force F1 is in a range of 30-150 N, when the fluid pressure P1 in the first enclosing member of the first beverage preparation device outside the capsule is in a range of 0.1-4 bar.

32. System according to claim 1, wherein the sealing member is deformable such that said sealing member fluid sealingly contacts at least a portion of the first free contact end of the first annular element if the first free contact end of the first annular element that is pressed against the sealing member has a plurality of radially extending open grooves uniformly spaced relative to each other in circumferential sense of said first free contact end of the first annular element.

33. System for preparing a potable beverage, the system comprising:
a multi-seal capsule containing a substance for the preparation of a potable beverage by extracting and/or dissolving the substance by means of a fluid supplied under pressure into the multi-seal capsule, wherein the multi-seal capsule comprises an aluminum capsule body having a central capsule body axis, the aluminum capsule body being provided with a bottom, a side wall and an outwardly extending flange, and further comprises an aluminum cover attached to the outwardly extending flange, the cover hermetically closing the multi-seal capsule,
a first beverage preparation device including a first enclosing member for receiving the multi-seal capsule, wherein the first enclosing member comprises first fluid injection means for supplying fluid under pressure into the multi-seal capsule received in the first enclosing member, wherein the first beverage preparation device comprises a first closing member for closing the first enclosing member, wherein the first enclosing member includes a first annular element having a first central annular element axis and a first free contact end, said first free contact end of the first annular element optionally being provided with a plurality of radially extending first open grooves,
a second beverage preparation device including a second enclosing member for receiving the multi-seal capsule, wherein the second enclosing member comprises second fluid injection means for supplying fluid under pressure into the multi-seal capsule received in the second enclosing member, wherein the second beverage preparation device comprises a second closing member for closing the second enclosing member, wherein the second enclosing member includes a second annular element having a central second annular element axis and a second free contact end, said second free contact end of the second annular element optionally being provided with a plurality of second radially extending open grooves,
wherein the multi-seal capsule includes a sealing member at the outwardly extending flange for providing a fluid sealing contact with the first enclosing member if the capsule is positioned in the first enclosing member and the first enclosing member is closed by means of the first closing member, such that the outwardly extending flange of the multi-seal capsule and at least a portion of the sealing member of the multi-seal capsule are sealingly engaged between the first enclosing member and the first closing member,
wherein the sealing member of the multi-seal capsule is integral with the outwardly extending flange and comprises at least one projection projecting from the outwardly extending flange, said at least one projection comprising a projection top, and wherein the at least one projection is configured such that its projection top exerts a radial force on the first free contact end of the first annular element if the capsule is positioned in the first enclosing member and the first enclosing member is closed by means of the first closing member of the first beverage preparation device,
wherein there is a first sealing interface between the multi-seal capsule and the first enclosing member for providing a fluid sealing contact if the multi-seal capsule is positioned in the first enclosing member and the first enclosing member is closed by means of the first closing member, wherein there is a second sealing interface, different than the first sealing interface, between the multi-seal capsule and the second enclosing member for providing a fluid sealing contact if the multi-seal capsule is positioned in the second enclosing member and the second enclosing member is closed by means of the second closing member.

34. A multi-seal capsule containing a substance for the preparation of a potable beverage by extracting and/or dissolving the substance by means of a fluid supplied under pressure into the multi-seal capsule, wherein the multi-seal capsule comprises an aluminum capsule body having a central capsule body axis, the aluminum capsule body being provided with a bottom, a side wall and an outwardly extending flange, and further comprises an aluminum cover attached to the outwardly extending flange, the cover hermetically closing the multi-seal capsule, wherein the multi-seal capsule is arranged for being receivable in:

a first beverage preparation device including a first enclosing member for receiving the multi-seal capsule, wherein the first enclosing member comprises first fluid injection means for supplying fluid under pressure into the multi-seal capsule received in the first enclosing member, wherein the first beverage preparation device comprises a first closing member for closing the first enclosing member, wherein the first enclosing member includes a first annular element having a first central annular element axis and a first free contact end, said first free contact end of the first annular element optionally being provided with a plurality of radially extending first open grooves, and a second beverage preparation device including a second enclosing member for receiving the multi-seal capsule, wherein the second enclosing member comprises second fluid injection means for supplying fluid under pressure into the multi-seal capsule received in the second enclosing member, wherein the second beverage preparation device comprises a second closing member for closing the second enclosing member, wherein the second enclosing member includes a second annular element having a central second annular element axis and a second free contact end, said second free contact end of the second annular element optionally being provided with a plurality of second radially extending open grooves, wherein the multi-seal capsule includes a sealing member at the outwardly extending flange for providing a fluid sealing contact with the first enclosing member if the capsule is positioned in the first enclosing member and the first enclosing member is closed by means of the first closing member, such that the outwardly extending flange of the multi-seal capsule and at least a portion of the sealing member of the multi-seal capsule are sealingly engaged between the first enclosing member and the first closing member, wherein the sealing member of the multi-seal capsule is integral with the outwardly extending flange and comprises at least one projection projecting from the outwardly extending flange, said at least one projection comprising a projection top, and wherein the at least one projection is configured such that its projection top exerts a radial force on the first free contact end of the first annular element if the capsule is positioned in the first enclosing member and the first enclosing member is closed by means of the first closing member of the first beverage preparation device, wherein there is a first sealing interface between the multi-seal capsule and the first enclosing member for providing a fluid sealing contact if the multi-seal capsule is positioned in the first enclosing member and the first enclosing member is closed by means of the first closing member, wherein there is a second sealing interface, different than the first sealing interface, between the multi-seal capsule and the second enclosing member for providing a fluid sealing contact if the multi-seal capsule is positioned in the second enclosing member and the second enclosing member is closed by means of the second closing member.

35. Alternative second capsule of the system according to claim 1.

\* \* \* \* \*